US011210521B2

(12) United States Patent
Aonuma et al.

(10) Patent No.: US 11,210,521 B2
(45) Date of Patent: *Dec. 28, 2021

(54) INFORMATION PROCESSING APPARATUS, IMAGE DISPLAY APPARATUS, CONTROL METHOD FOR INFORMATION PROCESSING APPARATUS AND IMAGE DISPLAY APPARATUS, AND COMPUTER PROGRAM

(71) Applicant: SEIKO EPSON CORPORATION, Tokyo (JP)

(72) Inventors: Masashi Aonuma, Shiojiri (JP); Kaoru Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,421

(22) Filed: Dec. 3, 2020

(65) Prior Publication Data

US 2021/0089776 A1 Mar. 25, 2021

Related U.S. Application Data

(63) Continuation of application No. 15/085,026, filed on Mar. 30, 2016, now Pat. No. 10,909,370.

(30) Foreign Application Priority Data

Apr. 9, 2015 (JP) .............................. JP2015-079646

(51) Int. Cl.
| | |
|---|---|
| *G06K 9/00* | (2006.01) |
| *G06F 3/16* | (2006.01) |
| *G06T 19/00* | (2011.01) |
| *G02B 27/01* | (2006.01) |
| *G06F 3/147* | (2006.01) |
| *H04N 5/232* | (2006.01) |

(52) U.S. Cl.
CPC ....... *G06K 9/00671* (2013.01); *G02B 27/017* (2013.01); *G06F 3/147* (2013.01);
(Continued)

(58) Field of Classification Search
None
See application file for complete search history.

(56) References Cited

U.S. PATENT DOCUMENTS

| | | | |
|---|---|---|---|
| 2011/0093447 A1 | 4/2011 | Goto | |
| 2012/0249741 A1* | 10/2012 | Maciocci | .............. G06T 15/503 348/46 |

(Continued)

FOREIGN PATENT DOCUMENTS

| | | |
|---|---|---|
| JP | 2002-230086 A | 8/2002 |
| JP | 2006-243397 A | 9/2006 |

(Continued)

OTHER PUBLICATIONS

Mar. 9, 2018 Office Action issued in U.S. Appl. No. 15/085,026.
(Continued)

*Primary Examiner* — Ifedayo B Iluyomade
(74) *Attorney, Agent, or Firm* — Oliff PLC

(57) ABSTRACT

An information processing apparatus includes a storing section configured to store scenario information and device information associated with the scenario information. The scenario information includes information configured such that another information processing apparatus executes presentation or reception of predetermined information when the other information processing apparatus determines that a predetermined condition is satisfied. The device information includes information representing specifications of hardware of the other information processing apparatus required when the other information processing apparatus executes at least one of the determination that the predetermined condition is (Continued)

satisfied and the presentation or the reception of the predetermined information.

10 Claims, 27 Drawing Sheets

(52) U.S. Cl.
CPC ............ *G06F 3/167* (2013.01); *G06T 19/006* (2013.01); *H04N 5/232939* (2018.08); *G02B 2027/014* (2013.01); *G02B 2027/0138* (2013.01); *G02B 2027/0141* (2013.01); *G09G 2340/12* (2013.01)

(56) References Cited

U.S. PATENT DOCUMENTS

| | | | |
|---|---|---|---|
| 2013/0169682 A1* | 7/2013 | Novak | G02B 27/0093 345/633 |
| 2014/0313223 A1 | 10/2014 | Koga | |
| 2015/0189002 A1 | 7/2015 | Goto | |

FOREIGN PATENT DOCUMENTS

| | | |
|---|---|---|
| JP | 2007-025960 A | 2/2007 |
| JP | 2011-087165 A | 4/2011 |
| JP | 2014-514652 A | 6/2014 |
| JP | 2014-215646 A | 11/2014 |
| WO | 2012/135553 A1 | 10/2012 |

OTHER PUBLICATIONS

Aug. 28, 2018 Office Action Issued in U.S. Appl. No. 15/085,026.
Dec. 31, 2018 Office Action issued in U.S. Appl. No. 15/085,026.
Jun. 28, 2019 Office Action Issued in U.S. Appl. No. 15/085,026.
Jan. 9, 2020 Office Action issued in U.S. Appl. No. 15/085,026.
May 28, 2020 Office Action Issued in U.S. Appl. No. 15/085,026.
Sep. 16, 2020 U.S. Notice of Allowance issued in U.S. Appl. No. 15/085,026.

* cited by examiner

DISPLAY RELATION, OBJECT RECOGNITION

| CONTROL INFORMATION | | DATA |
|---|---|---|
| OBJECT NAME | CAP |  |
| TYPE | 3D MODEL | |
| FEATURE POINT | (X1, Y1, Z1) | |
| DISPLAY POSITION | (X2, Y2, Z2) | |
| SIZE OF DISPLAY REGION | S1 | |

DISPLAY RELATION

| CONTROL INFORMATION | | DATA |
|---|---|---|
| OBJECT NAME | DISPLAY NAVIGATION 1 | PLEASE MOVE THE CAP TO THE POSITION OF 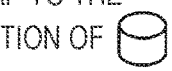 |
| TYPE | CHARACTER IMAGE | |
| DISPLAY POSITION | (X3, Y3, Z3) | |
| SIZE OF DISPLAY REGION | S2 | |
| FONT SIZE | S3 | |

OBJECT RECOGNITION

| CONTROL INFORMATION | | DATA |
|---|---|---|
| OBJECT NAME | PET BOTTLE | 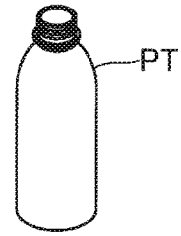 |
| TYPE | 3D MODEL | |
| FEATURE POINT | (X4, Y4, Z4) | |
| OBJECT SHAPE CHANGE | FIXED | |
| ALLOWABLE RECOGNITION ACCURACY (mm) | S4 | |
| STATE AT END TIME | AFTER CAP ATTACHMENT | |

UI

| CONTROL INFORMATION | | DATA |
|---|---|---|
| OBJECT NAME | SOUND NAVIGATION 2 | "PLEASE MOVE THE CAP TO THE POSITION OF THE AR IMAGE" |
| TYPE | SOUND OUTPUT | |
| TIME (s) | S5 | |
| LINK TO SUBSTITUTE TEXT | PRESENT | |

UI

| CONTROL INFORMATION | | DATA |
|---|---|---|
| OBJECT NAME | INPUT CHECK 1 | "YES" |
| TYPE | SOUND RECOGNITION | |
| LINK TO INPUT RECEPTION | PRESENT | |

FIG. 4

| | SETTING CONDITION | PROCESSING CONTENT |
|---|---|---|
| 1 | OBJECT RECOGNITION AND TRACKING | OBJECT RECOGNITION AND TRACKING OF FIRST OBJECT AND SECOND OBJECT |
| 2 | DETECTION OF FIRST CONDITION | DETECT ONLY SECOND OBJECT |
| 3 | DETECTION OF SECOND CONDITION | DETECT ONLY FIRST OBJECT |
| 4 | DETECTION OF THIRD CONDITION | DETECT FIRST OBJECT AND SECOND OBJECT APART FROM EACH OTHER |
| 5 | DETECTION OF FOURTH CONDITION | DETECT FIRST OBJECT AND SECOND OBJECT IN CONTACT WITH EACH OTHER |
| 6 | DETECTION OF FIFTH CONDITION | DETECT PREDETERMINED SOUND AFTER DETECTION OF FOURTH CONDITION |

FIG.23

DISPLAY RELATION

| OBJECT | PROCESSING CONTENT |
|---|---|
| MODEL OF FIRST OBJECT | SUPERIMPOSE AND DISPLAY ON DETECTED SECOND OBJECT AS CAP IMAGE IM1 |
| MODEL OF SECOND OBJECT | NOT DISPLAY |
| DISPLAY IMAGE | DISPLAY CURSOR IMAGE CS3 |

UI

| OBJECT | PROCESSING CONTENT |
|---|---|
| OUTPUT SOUND | OUTPUT SOUND " PLEASE MOVE THE CAP IN THE DIRECTION OF THE ARROW " |
| DISPLAY IMAGE | DISPLAY CHARACTER IMAGE TX3 OF " PLEASE MOVE THE CAP IN THE DIRECTION OF THE ARROW " |
| SOUND DETECTION | NO RECEPTION |

FIG.24

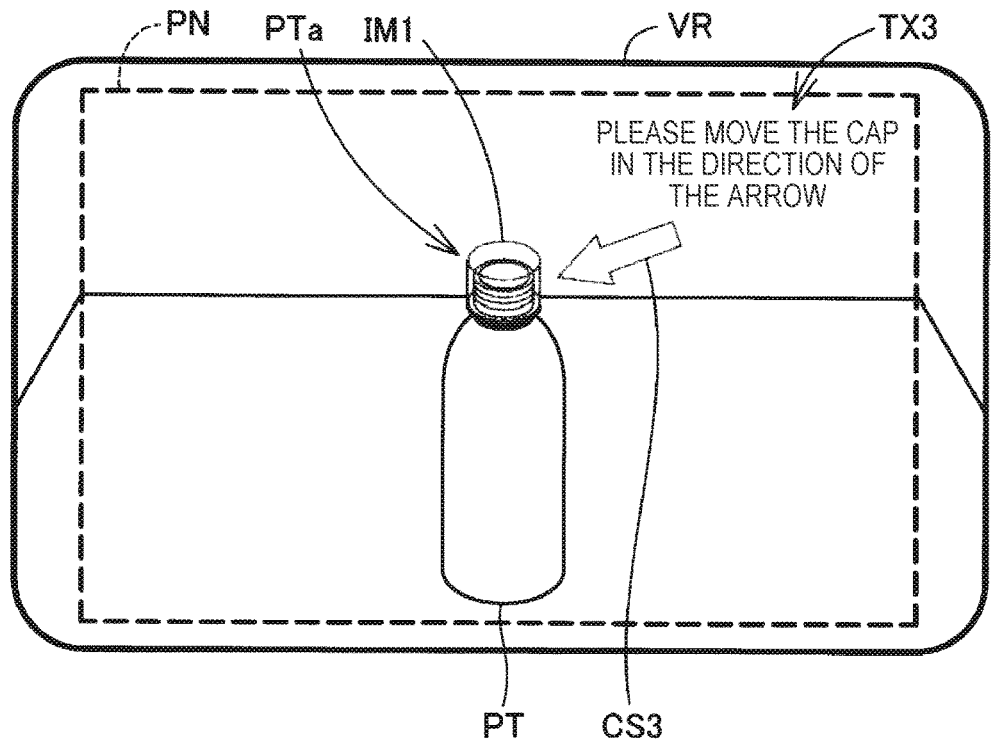

FIG.25

DISPLAY RELATION

| OBJECT | PROCESSING CONTENT |
|---|---|
| MODEL OF FIRST OBJECT | DISPLAY CAP IMAGE IM1 OF FIRST OBJECT AND BOTTLE IMAGE IM2 OF SECOND OBJECT IN FINAL STATE |
| MODEL OF SECOND OBJECT | |
| DISPLAY IMAGE | DISPLAY CURSOR IMAGE CS3 |

UI

| OBJECT | PROCESSING CONTENT |
|---|---|
| OUTPUT SOUND | OUTPUT SOUND " PLEASE MOVE THE CAP IN THE DIRECTION OF THE ARROW " |
| DISPLAY IMAGE | DISPLAY CHARACTER IMAGE TX3 OF " PLEASE MOVE THE CAP IN THE DIRECTION OF THE ARROW " |
| SOUND DETECTION | NO RECEPTION |

FIG.26

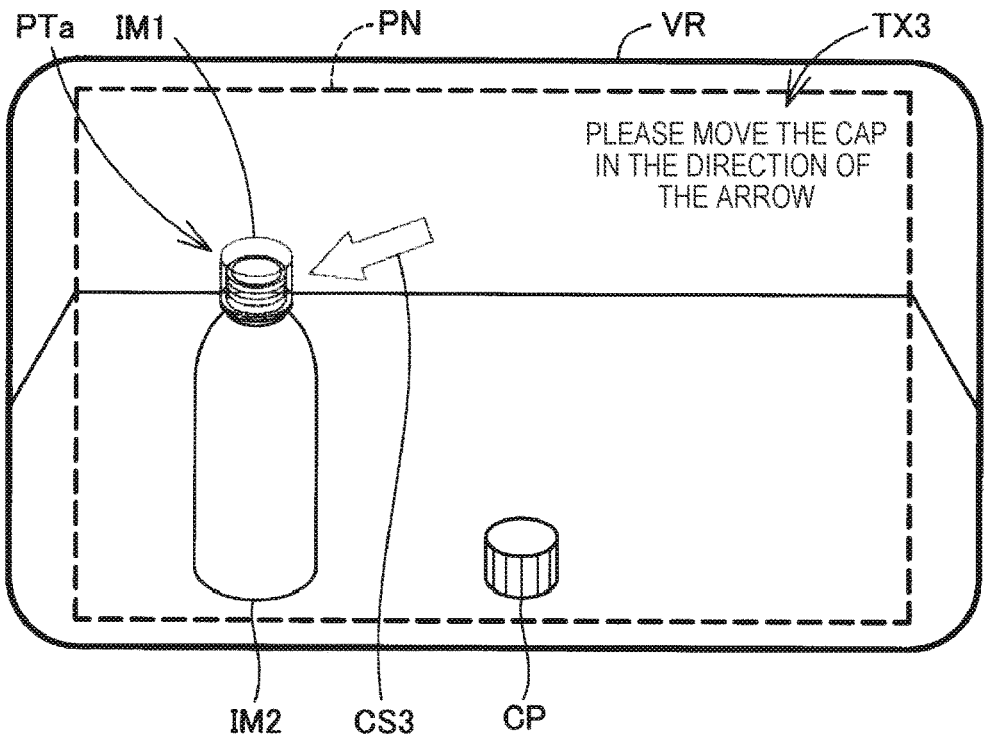

FIG.27

DISPLAY RELATION

| OBJECT | PROCESSING CONTENT |
| --- | --- |
| MODEL OF FIRST OBJECT | SUPERIMPOSE AND DISPLAY ON DETECTED SECOND OBJECT AS CAP IMAGE IM1 |
| MODEL OF SECOND OBJECT | NOT DISPLAY |
| DISPLAY IMAGE | DISPLAY CURSOR IMAGE CS1 |

UI

| OBJECT | PROCESSING CONTENT |
| --- | --- |
| OUTPUT SOUND | OUTPUT SOUND " PLEASE MOVE THE CAP IN THE DIRECTION OF THE ARROW " |
| DISPLAY IMAGE | DISPLAY CHARACTER IMAGE TX3 OF " PLEASE MOVE THE CAP IN THE DIRECTION OF THE ARROW " |
| SOUND DETECTION | NO RECEPTION |

FIG.28

DISPLAY RELATION

| OBJECT | PROCESSING CONTENT |
|---|---|
| MODEL OF FIRST OBJECT | NOT DISPLAY |
| MODEL OF SECOND OBJECT | NOT DISPLAY |
| DISPLAY IMAGE | DISPLAY CURSOR IMAGE CS3 |

UI

| OBJECT | PROCESSING CONTENT |
|---|---|
| OUTPUT SOUND 1 | OUTPUT SOUND " PLEASE TURN THE CAP IN THE DIRECTION OF THE ARROW AND CLOSE THE CAP " |
| DISPLAY IMAGE 1 | DISPLAY CHARACTER IMAGE TX4 OF " PLEASE TURN THE CAP IN THE DIRECTION OF THE ARROW AND CLOSE THE CAP " |
| OUTPUT SOUND 2 | OUTPUT SOUND " PLEASE SAY " END " WHEN THE CAP IS CLOSED " |
| DISPLAY IMAGE 2 | DISPLAY TEXT IMAGE TX5 OF " PLEASE SAY " END " WHEN THE CAP IS CLOSED " |
| SOUND DETECTION | NO RECEPTION |

FIG.30

INFORMATION PROCESSING APPARATUS, IMAGE DISPLAY APPARATUS, CONTROL METHOD FOR INFORMATION PROCESSING APPARATUS AND IMAGE DISPLAY APPARATUS, AND COMPUTER PROGRAM

This application is a Continuation of U.S. application Ser. No. 15/085,026, filed Mar. 30, 2016, which claims priority to Japanese Patent Application No. 2015-079646, filed Apr. 9, 2015, the entire disclosures of which is incorporated by reference.

BACKGROUND

1. Technical Field

The present invention relates to a technique of an information processing apparatus.

2. Related Art

As described in JP-A-2002-230086 (Patent Literature 1), there has been known a display apparatus that displays, in synchronization with a moving image of a video-captured object, an image generated according to a part of motions of the video-captured object. JP-T-2014-514652 (Patent Literature 2) describes a method in which a first processor generates image data and supplies the generated image data to a display system and a second processor supplies a gesture and a point coordinate of a user subjected to image pickup to the first processor. In this method, the first processor performs various kinds of operation on the basis of the gesture of the user subjected to the image pickup.

However, Patent Literature 1 or Patent Literature 2 do not mention that image data is generated on the basis of an object subjected to image pickup. When some processing such as display of an image based on image data is executed, it is likely that a deficiency such as low processing speed of a moving image is caused by a difference in the performance of a device that executes the processing. Besides, in an information processing apparatus in the past, a reduction in the size, a reduction in the costs, saving of resources, facilitation of manufacturing, improvement of convenience of use, and the like of the information processing apparatus have been desired.

SUMMARY

An advantage of some aspects of the invention is to solve at least a part of the problems described above, and the invention can be implemented as the following aspects.

(1) An aspect of the invention provides an information processing apparatus. The information processing apparatus includes a storing section configured to store scenario information and device information associated with the scenario information. The scenario information includes information configured such that another information processing apparatus executes presentation or reception of predetermined information when the other information processing apparatus determines that a predetermined condition is satisfied. The device information includes information representing specifications of hardware of the other information processing apparatus required when the other information processing apparatus executes at least one of the determination that the predetermined condition is satisfied and the presentation or the reception of the predetermined information. With the information processing apparatus according to this aspect, when the scenario information stored in the storing section is executed by the other information processing apparatus, the device information is referred to concerning a device necessary for the scenario information stored in the storing section to be executed. Even if there is a difference in performance between the device executing the scenario information and various devices stored in the device information, the device executing the scenario information can execute, referring to the device information, the presentation or the reception of the predetermined information included in the scenario information with a deficiency suppressed.

(2) In the information processing apparatus according to the aspect, the information processing apparatus may further include a generating section configured to generate the scenario information. The device information may include information representing specifications of hardware of the generating section. With the information processing apparatus according to the aspect, the device information is easily created when the scenario information is generated.

(3) In the information processing apparatus according to the aspect, the information processing apparatus may further include a first image pickup section configured to pick up an outside scene. The predetermined condition may be detection of a specific target set in advance out of the picked-up image. The presentation of the predetermined information may be display of an image associated with the predetermined condition. With the information processing apparatus according to this aspect, the detection of the specific target is created as the predetermined condition included in the scenario information out of an image pickup range of the first image pickup section. The display of the image is created as the presentation of the predetermined information. Therefore, a user can generate the scenario information simply by picking up an image of the object as an image that the user desires to display. Convenience of use for the user in generating the scenario information is improved.

(4) In the information processing apparatus according to the aspect, the device information may include information representing specifications of hardware of the first image pickup section and information concerning hardware of an image display section configured to execute the display of the image. With the information processing apparatus according to the aspect, it is possible to suppress deficiency of a display image serving as the presentation of the predetermined information at time when the scenario information is executed due to a difference between the information concerning the hardware of the image display section of the apparatus executing the scenario information and the information representing the specifications of the hardware of the first image pickup section of the device information.

(5) In the information processing apparatus according to the aspect, the first image pickup section may measure a distance to the specific target. The display of the image may be executed as display of a three-dimensional image visually recognized in a position of the measured distance. With the information processing apparatus according to the aspect, an image including the distance to the specific target included in the image pickup range is automatically created. An image based on information concerning the distance is created. Therefore, the user can easily generate the scenario information including a stereoscopic image. Convenience of use of the user in generating the scenario information is further improved.

(6) In the information processing apparatus according to the aspect, the scenario information may include information concerning a sound output. The predetermined condition may include timing of the sound output. The device information may include information representing specifications of hardware of a sound output section configured to execute the sound output. With the information processing apparatus according to the aspect, as the presentation of the predetermined information included in the scenario information, processing of the sound output is also included in addition to processing of image display. Therefore, convenience for the user is improved.

(7) Another aspect of the invention provides an image display apparatus including an image display section configured to display an image. The image display apparatus includes: an information acquiring section configured to acquire the scenario information and the device information included in the information processing apparatus according to the aspect; and a control-information changing section configured to perform, when executing the scenario information, comparison of display apparatus information representing information concerning performance of the image display apparatus and the device information and change, on the basis of the comparison, the presentation or the reception of the predetermined information of the scenario information to be executed. With the image display apparatus according to the aspect, when scenario information generated by another information processing apparatus is executed, even if the image display apparatus does not include a device included in the information processing apparatus that generates the scenario information, the image display apparatus executes the scenario information according to a device included in the image display apparatus. Consequently, it is unnecessary to generate the scenario information according to each of image display apparatuses that execute the scenario information. The information processing apparatus that generates the scenario information is not limited. Therefore, convenience of use for a person who performs generation and provision of the scenario information is improved. The scenario information is executed according to the device of the image display apparatus that executes the scenario information. Therefore, it is possible to improve convenience of a user who executes the scenario information.

(8) In the image display apparatus according to the aspect, the image display section may be worn on the head of a user and capable of transmitting an outside scene. The image display apparatus may further include: a second image pickup section configured to pick up an image of a part of the outside scene; and an image setting section configured to cause the image display section to execute the display of the image in association with a position of a specific target detected from a picked-up image. With the image display apparatus according to the aspect, it is possible to cause the user to visually recognize a real specific target and a display image displayed as the presentation of the predetermined information further in association with each other. Therefore, convenience of use for the user is improved.

Not all of the plurality of components included in the aspect of the invention explained above are essential. In order to solve a part or all of the problems explained above or attain a part or all of the effects described in this specification, concerning a part of the plurality of components, it is possible to appropriately perform a change, deletion, replacement of the components with other components, and deletion of a part of limitation contents. In order to solve a part or all of the problems explained above or in order to attain a part or all of the effects described in this specification, it is also possible to combine a part or all of the technical features included in one aspect of the invention explained above with a part or all of the technical features included in the other aspects of the invention to form an independent one aspect of the invention.

The storing section may store, for example, scenario information and device information associated with the scenario information. The scenario information may include information configured such that another information processing apparatus executes presentation or reception of predetermined information, for example, when the other information processing apparatus determines that a predetermined condition is satisfied. The device information may include information representing specifications of hardware of the other information processing apparatus required when the other information processing apparatus executes at least one of the determination that the predetermined condition is satisfied and the presentation or the reception of the predetermined information. Such an apparatus can be implemented as, for example, an information processing apparatus. However, the apparatus can also be implemented as other apparatuses other than the information processing apparatus. According to such an aspect, it is possible to solve at least one of various problems such as improvement and simplification of operability of the apparatus, integration of the apparatus, and improvement of convenience for a user who uses the apparatus. A part or all of the technical features of the aspects of the information processing apparatus explained above can be applied to the apparatus.

The invention can be implemented in various forms other than the information processing apparatus. For example, the invention can be implemented in forms such as an image display apparatus, a head-mounted display device, a control method for the information processing apparatus, the image display apparatus, and the head-mounted display device, an information processing system, an image display system, a control system, a computer program for implementing functions of the information processing apparatus, a recording medium having the computer program recorded therein, and a data signal including the computer program and embodied in a carrier wave.

BRIEF DESCRIPTION OF THE DRAWINGS

The invention will be described with reference to the accompanying drawings, wherein like numbers reference like elements.

FIG. 4 is an explanatory diagram showing an example of object information included in a scenario data management table.

FIG. 23 is a list showing contents of respective kinds of processing in the object execution processing in the third embodiment.

FIG. 24 is a list showing processing contents of display relations and UIs executed in association with a first condition.

FIG. 25 is an explanatory diagram showing the visual field visually recognized by a user when the first condition is detected.

FIG. 26 is a list showing processing contents of display relations and UIs executed in association with a second condition.

FIG. 27 is an explanatory diagram showing the visual field visually recognized by the user when the second condition is detected.

FIG. 28 is a list showing processing contents of display relations and UIs executed in association with a third condition.

FIG. 30 is a list showing processing contents of display relations and UIs executed in association with a fourth condition.

DESCRIPTION OF EXEMPLARY EMBODIMENTS

Modes of implementation of the invention are explained in the following order on the basis of the embodiments.
A. First Embodiment
A-1. Configuration of an information processing apparatus
A-2. AR scenario creation processing
B. Second Embodiment
B-1. Configuration of an apparatus that executes an AR scenario
B-2. AR scenario execution processing
C. Third Embodiment
D. Fourth Embodiment
E. Modifications

A. First Embodiment

A-1. Configuration of an Information Processing Apparatus

Figure 1:
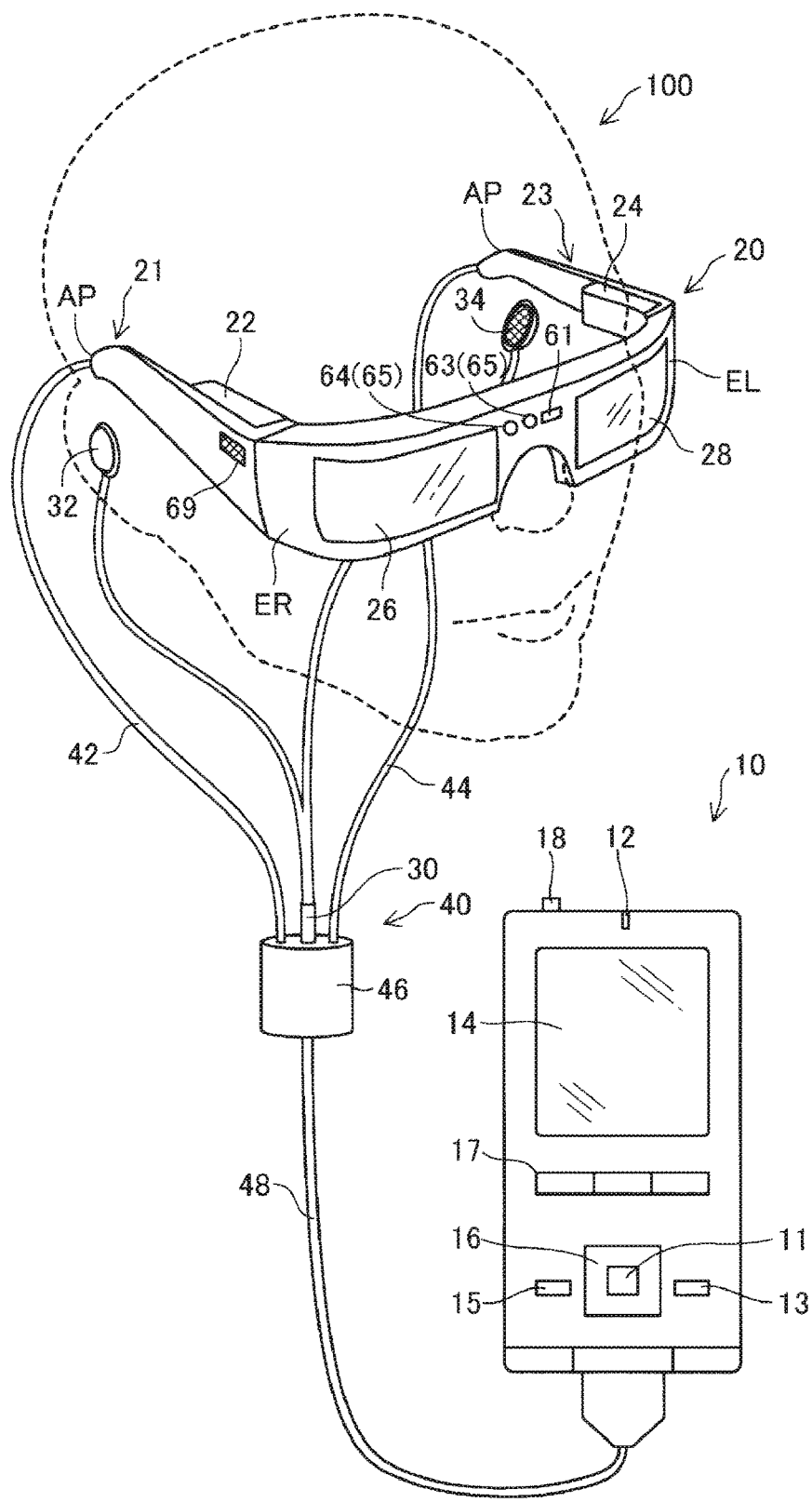
FIG. 1 is an explanatory diagram showing the exterior configuration of a head-mounted display device (an HMD) functioning as an information processing apparatus in a first embodiment of the invention.

FIG. 1 is an explanatory diagram showing the exterior configuration of a head-mounted display device 100 (an HMD 100) functioning as an information processing apparatus in a first embodiment of the invention. The head-mounted display device 100 is a display device mounted on a head and is called head mounted display (HMD) as well. The HMD 100 in this embodiment is an optically transmissive head-mounted display device with which a user can visually recognize a virtual image and at the same time directly visually recognize an outside scene via light from the scene. The HMD 100 in this embodiment corresponds to the information processing apparatus in the appended claims.

The HMD 100 includes an image display section 20 that causes the user to visually recognize the virtual image in a state in which the image display section 20 is worn on the head of the user and a control section 10 (a controller 10) that controls the image display section 20.

The image display section 20 is a wearing body worn on the head of the user. In this embodiment, the image display section 20 has an eyeglass shape. The image display section 20 includes a right holding section 21, a right display driving section 22, a left holding section 23, a left display driving section 24, a right optical-image display section 26, a left optical-image display section 28, a camera 61, an infrared LED 64, a TOF sensor 63, and a microphone 69. The right optical-image display section 26 and the left optical-image display section 28 are disposed to be respectively located in front of the right eye and in front of the left eye of the user when the user wears the image display section 20. One end of the right optical-image display section 26 and one end of the left optical-image display section 28 are connected to each other in a position corresponding to the middle of the forehead of the user when the user wears the image display section 20.

The right holding section 21 is a member provided to extend from an end portion ER, which is the other end of the right optical-image display section 26, to a position corresponding to the temporal region of the user when the user wears the image display section 20. Similarly, the left holding section 23 is a member provided to extend from an end portion EL, which is the other end of the left optical-image display section 28, to a position corresponding to the temporal region of the user when the user wears the image display section 20. The right holding section 21 and the left holding section 23 hold the image display section 20 on the head of the user like temples of eyeglasses.

The right display driving section 22 and the left display driving section 24 are disposed on sides opposed to the head of the user when the user wears the image display section 20. Note that, in the following explanation, the right holding section 21 and the left holding section 23 are collectively simply referred to as "holding sections" as well, the right display driving section 22 and the left display driving section 24 are collectively simply referred to as "display driving sections" as well, and the right optical-image display section 26 and the left optical-image display section 28 are collectively simply referred to as "optical-image display sections" as well.

The display driving sections 22 and 24 include liquid crystal displays 241 and 242 (hereinafter referred to as "LCDs 241 and 242" as well) and projection optical systems 251 and 252 (see FIG. 9). Details of the configuration of the display driving sections 22 and 24 are explained below. The optical-image display sections 26 and 28 functioning as optical members include light guide plates 261 and 262 (see FIG. 2) and dimming plates. The light guide plates 261 and 262 are formed of a light transmissive resin material or the like and guide image lights output from the display driving sections 22 and 24 to the eyes of the user. The dimming plates are thin plate-like optical elements and are arranged to cover the front side of the image display section 20 on the opposite side of the side of the eyes of the user. The dimming plates protect the light guide plates 261 and 262 and suppress damage, adhesion of soil, and the like to the light guide plates 261 and 262. By adjusting the light transmittance of the dimming plates, it is possible to adjust an external light amount entering the eyes of the user and adjust easiness of visual recognition of the virtual image. Note that the dimming plates can be omitted.

The camera 61 is disposed in a position corresponding to the middle of the forehead of the user when the user wears the image display section 20. Therefore, in a state in which the user wears the image display section 20 on the head, the camera 61 picks up an image of an outside scene, which is a scene on the outside, in a visual line direction of the user and acquires a picked-up image. The camera 61 transmits RGB data serving as respective data of an R component, a G component, and a B component of the outside scene subjected to the image pickup to a sensor control section 145 of the control section 10 explained below. Details are explained below. An AR (Augmented Reality) scenario including display of a still image and a moving image and sound output according to set order is generated on the basis of a specific target in the acquired picked-up image. When the generated AR scenario is executed in the HMD 100 in this embodiment, an image display apparatus different from the HMD 100 including an image pickup section, or the like, the AR scenario generated by the HMD 100 in this embodiment is reproduced in association with a target object detected out of a picked-up image picked up by the image pickup section of the image display apparatus that executes the AR scenario. The camera 61 is a monocular camera but may be a stereo camera. A plurality of picked-up images may be acquired by a plurality of cameras 61. The camera 61 corresponds to the first image pickup section in the appended claims. The AR scenario corresponds to the scenario information in the appended claims.

The infrared LED 64 and the TOF sensor 63 are disposed in a position adjacent to the camera 61, that is, a position corresponding to the middle of the forehead of the user when the user wears the image display section 20. The infrared LED 64 is a light emitting diode (LED) that emits an infrared ray. The TOF sensor 63 detects reflected light of the infrared ray emitted by the infrared LED 64 and reflected on a specific object. Note that the infrared LED 64 and the TOF sensor 63 are collectively referred to as distance sensor 65 as well. The distance sensor 65 transmits data of innumerable points of the infrared reflected light reflected on the surface of the object to the sensor control section 145 of the control section 10. Note that, in other embodiments, a plurality of distance sensors 65 may be used. A distance to an object in an image pickup range of the camera 61 may be measured by a method different from a method in this embodiment. Note that, in the following explanation, the measured distance is represented as a D component and referred to as RGBD data as well together with RGB data.

Figure 2:
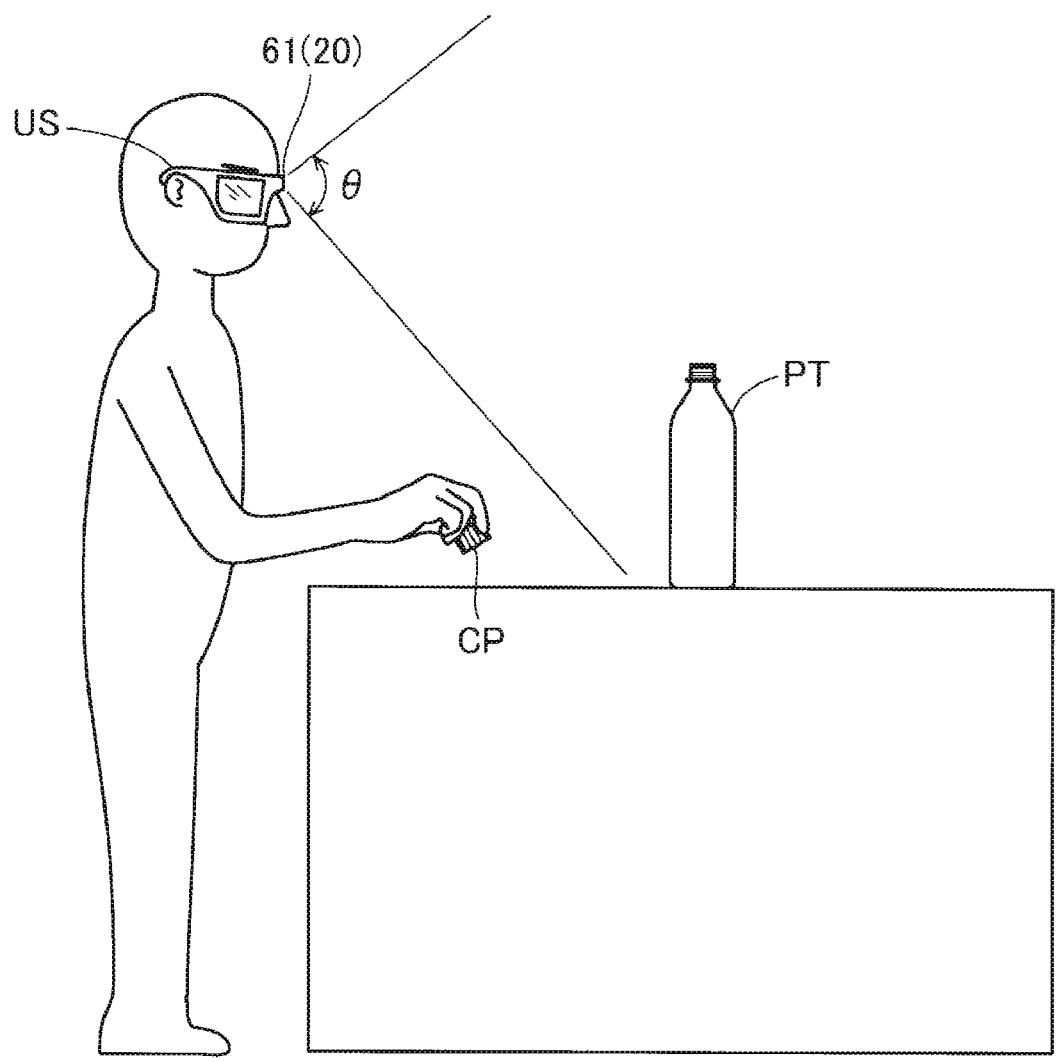
FIG. 2 is an image diagram of a state in which a camera of an image display section is picking up an image of a PET bottle, which is an object.

FIG. 2 is an image diagram of a state in which the camera 61 of the image display section 20 is picking up a PET bottle PT, which is an object. In FIG. 2, a state is shown in which a user US wearing the image display section 20 on the head is about to attach a cap CP held by the right hand to the PET bottle PT not attached with the cap CP. In this state, the camera 61 of the image display section 20 can pick up an image of an outside scene in a range of an angle of view θ of the camera 61.

The microphone 69 is a device that acquires sound on the outside. The microphone 69 is formed on the opposite side (the outer side) of a side opposed to the user in the right display driving section 22 when the user wears the image display section 20.

The image display section 20 further includes a connecting section 40 for connecting the image display section 20 to the control section 10. The connecting section 40 includes a main body cord 48 connected to the control section 10, a right cord 42 and a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24. The coupling member 46 is provided at a branching point of the right cord 42 and the left cord 44. The coupling member 46 includes a jack for connecting an earphone plug 30. A right earphone 32 and a left earphone 34 extend from the earphone plug 30.

The image display section 20 and the control section 10 perform transmission of various signals via the connecting section 40. Connectors (not shown in the figure), which fit with each other, are respectively provided at an end of the main body cord 48 on the opposite side of the coupling member 46 and in the control section 10. The control section 10 and the image display section 20 are connected and disconnected according to fitting and unfitting of the connector of the main body cord 48 and the connector of the control section 10. For example, a metal cable or an optical fiber can be adopted as the right cord 42, the left cord 44, and the main body cord 48.

The control section 10 is a device for controlling the HMD 100. The control section 10 includes a determination key 11, a lighting section 12, a display switching key 13, a track pad 14, a luminance switching key 15, a direction key 16, a menu key 17, and a power switch 18. The determination key 11 detects pressing operation and outputs a signal for determining contents of the operation in the control section 10. The lighting section 12 notifies, with a light emission state thereof, an operation state of the HMD 100. As the operation state of the HMD 100, there is, for example, ON/OFF of a power supply. As the lighting section 12, for example, an LED (Light Emitting Diode) is used. The display switching key 13 detects pressing operation and outputs, for example, a signal for switching a display mode of a content moving image to 3D and 2D. The track pad 14 detects operation by a finger of the user on an operation surface of the track pad 14 and outputs a signal corresponding to detected content. As the track pad 14, track pads of various types such as an electrostatic type, a pressure detection type, and an optical type can be adopted. The luminance switching key 15 detects pressing operation and outputs a signal for increasing or reducing the luminance of the image display section 20. The direction key 16 detects pressing operation on keys corresponding to the upward, downward, left, and right directions and outputs a signal corresponding to detected content. The power switch 18 detects slide operation of the switch to switch a power supply state of the HMD 100.

Figure 3:
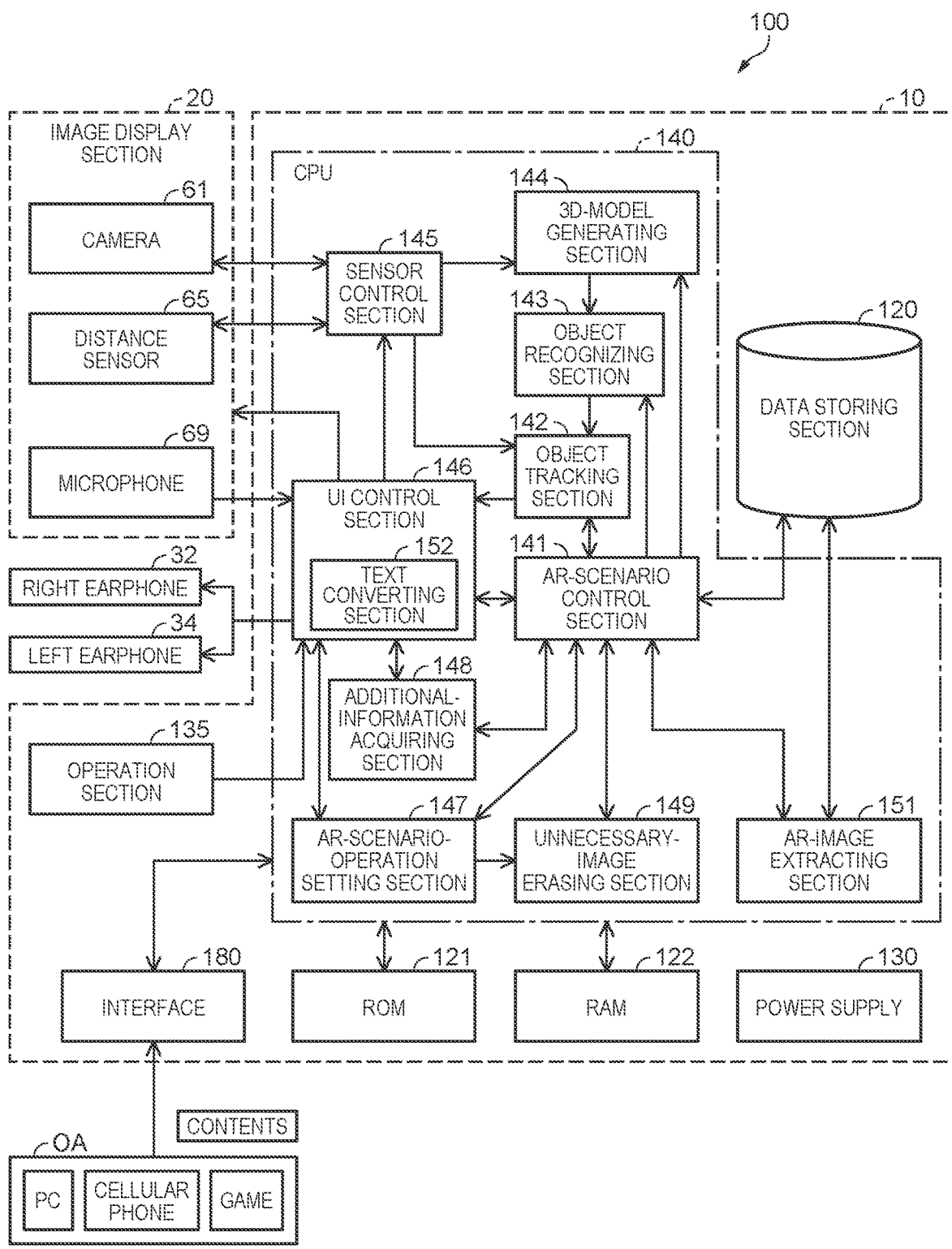
FIG. 3 is a block diagram functionally showing the configuration of the HMD in the first embodiment.

FIG. 3 is a block diagram functionally showing the configuration of the HMD 100 in the first embodiment. As shown in FIG. 3, the image display section 20 includes the camera 61, the TOF sensor 63 and the infrared LED 64 functioning as the distance sensor 65, and the microphone 69. Note that, in FIG. 3, a part of a function of generating a virtual image that the image display section 20 causes the user to visually recognize and a part of a function related to generation of a virtual image in a CPU 140 are not shown in the figure. In the following explanation, the image display section 20 generating a virtual image is simply referred to as displaying an image as well and the generated virtual image is simply referred to as display image as well.

The control section 10 includes the CPU 140, an operation section 135, an interface 180, a data storing section 120, a power supply 130, a ROM 121, and a RAM 122. The operation section 135 receives operation by the user. The operation section 135 is configured from the determination key 11, the display switching key 13, the track pad 14, the luminance switching key 15, the direction key 16, the menu key 17, and the power switch 18. The interface 180 is an interface for connecting various external apparatuses OA, which are supply sources of contents, to the control section 10. Examples of the external apparatuses OA include a personal computer PC, a cellular phone terminal, and a game terminal. As the interface 180, for example, a USB interface, a micro USB interface, or an interface for a memory card can be used.

The power supply 130 supplies electric power to the sections of the HMD 100. As the power supply 130, for example, a secondary cell can be used. The ROM 121 has stored therein various computer programs. The CPU 140 reads out the computer programs stored in the ROM 121 and executes writing in the RAM 122 to thereby execute the various computer programs. The CPU 140 includes an AR-scenario control section 141, an object tracking section 142, an object recognizing section 143, a 3D-model generating section 144, the sensor control section 145, a UI control section 146, an AR-scenario-operation setting section 147, an additional-information acquiring section 148, an unnecessary-image erasing section 149, and an AR-image extracting section 151.

The sensor control section 145 acquires RGB data of a picked-up image transmitted from the camera 61 and data of innumerable points in an image pickup range transmitted from the distance sensor 65. The sensor control section 145 transmits data acquired from the camera 61 and the distance sensor 65 to the object tracking section 142 and the three-dimensional-model generating section 144 (3D-model generating section 144). The sensor control section 145 controls the camera 61 and the distance sensor 65 on the basis of control signals transmitted from the UI control section 146.

The 3D-model generating section 144 generates, on the basis of a control signal transmitted from the AR-scenario control section 141, a three-dimensional model (3D model) concerning a target in the image pickup range using the RGB data of the picked-up image transmitted from the sensor control section 145 and distance data of the distance sensor 65. The 3D-model generating section 144 acquires the shape of the object in the image pickup range on the basis of the distance data acquired by the distance sensor 65, detects the same boundary in the acquired shape of the object, and generates the 3D model. The 3D-model generating section 144 colors the generated 3D model on the basis of the RGB data of the picked-up image. The 3D-model generating section 144 transmits the generated colored 3D model and data of the detected same boundary to the object recognizing section 143.

The object recognizing section 143 recognizes, on the basis of a control signal transmitted from the AR-scenario control section 141, as one object, a 3D model having data of a continuous boundary using the 3D model generated by the 3D-model generating section 144 and the data of the detected same boundary. In other words, the object recognizing section 143 separates the 3D model and recognizes the 3D model as individual objects on the basis of data of discontinuous boundaries. The object recognizing section 143 acquires, via the AR-scenario control section 141, information concerning parts (e.g., hands and feet) of a human body stored in the data storing section 120 explained below. The object recognizing section 143 extracts the human body out of the 3D model by applying pattern matching and a statistical identification method to the recognized object on the basis of the acquired information concerning the parts of the human body.

The object tracking section 142 specifies, on the basis of a control signal transmitted from the AR-scenario control section 141, a movement of an object moving while the camera 61 is picking up an image among recognized individual objects. The object tracking section 142 transmits information for specifying an object that is moving (a moving object) and an object that is not moving (a stationary object) to the UI control section 146 and the AR-scenario control section 141.

The UI control section 146 transmits control signals to the image display section 20, the earphones 32 and 34, and the sections included in the CPU 140 on the basis of sound acquired by the microphone 69 and operation received by the operation section 135. For example, the UI control section 146 transmits, on the basis of operation received by the operation section 135, control signals for controlling the camera 61 and the distance sensor 65 to the sensor control section 145. The UI control section 146 transmits, concerning specified objects transmitted from the object tracking section 142, image signals for displaying the respective objects on the image display section 20 to the image display section 20 such that the user can select and operate the respective objects. The UI control section 146 includes a text converting section 152 that automatically converts sound acquired by the microphone 69 into a character image in AR scenario creation processing explained below. The text converting section 152 recognizes the acquired sound and converts the acquired sound into a character image corresponding thereto.

The AR-scenario-operation setting section 147 performs setting concerning a situation operated by an AR scenario created by the HMD 100. Note that the AR scenario includes sound, a character image, and the like inserted into the AR scenario by the user. For example, when a target object associated with a generated moving image is detected as a real object by image recognition out of an image pickup range of image pickup by an apparatus capable of executing the AR scenario, the AR-scenario-operation setting section 147 performs setting such that the apparatus can execute the AR scenario. In the image pickup range of the image pickup by the apparatus capable of executing the AR scenario, a specific object set in advance is detected, whereby the AR-scenario-operation setting section 147 sets a plurality of branches and the like in the AR scenario to be executed. Note that, when the AR scenario is being executed, an image displayed in association with a real target detected out of the image pickup range and included in the AR scenario being executed is referred to as AR image as well.

The additional-information acquiring section 148 acquires information added to the AR signal on the basis of an operation signal transmitted from the UI control section 146 and received by the operation section 135 functioning as a user interface (UI), sound acquired by the microphone 69, and a control signal transmitted from the AR-scenario control section 141. Examples of the information added to the AR scenario include setting of a display method such as expansion and reduction of an image set by operation received by the operation section 135 and insertion of a text into which the sound acquired by the microphone 69 is converted.

The AR-scenario control section 141 controls the sections of the CPU 140 in order to create an AR scenario. The AR-scenario control section 141 distinguishes, on the basis of the moving object and the stationary object specified by the object tracking section 142 and the operation received by the UI, an object to be generated as the AR image and an object not to be generated as the AR image and transmits a result of the distinction to the unnecessary-image erasing section 149 and the AR-image extracting section 151. The AR-scenario control section 141 transmits and receives various data to and from the data storing section 120 to thereby read and edit an already created AR scenario and cause the data storing section 120 to store an AR scenario created anew.

The unnecessary-image erasing section 149 erases an image of the object not to be generated as the AR image among the specified objects on the basis of control signals transmitted from the AR-scenario control section 141 and the AR-scenario-operation setting section 147. In other words, the unnecessary-image erasing section 149 is also considered to select an object to be generated as the AR image out of a picked-up image. The unnecessary-image erasing section 149 transmits an image signal of the image from which unnecessary the object has been erased to the AR-scenario control section 141. In this embodiment, when the operation section 135 does not receive predetermined operation, the unnecessary-image erasing section 149 automatically erases a picked-up image of a human body as an unnecessary image. Note that, in the other embodiments, the unnecessary-image erasing section 149 does not need to automatically erase an image of a human body or the like.

The AR-image extracting section 151 extracts an object to be displayed by the AR scenario as the AR image and generates an image on the basis of a control signal transmitted from the AR-scenario control section 141. The AR-image extracting section 151 generates the AR image as a three-dimensional image on the basis of the distance data acquired by the distance sensor 65. The AR-image extracting section 151 colors the generated AR image on the basis of the RGB data acquired by the camera 61. The AR-image extracting section 151 transmits a signal for specifying an object to be generated as the extracted AR image to the AR-scenario control section 141. The AR-image extracting section 151 can automatically extract, by receiving predetermined operation via the operation section 135, a specific object stored in the data storing section 120 as the object to be generated as the AR image. Examples of the object to be extracted include an object specified by a drawing created by a CAD (computer aided design).

The AR-scenario control section 141 receives the image signal of the erased unnecessary image of the object transmitted from the unnecessary-image erasing section 149 and the image signal of the AR image extracted by the AR-image extracting section 151 and creates an AR scenario. When creating the AR scenario, the AR-scenario control section 141 creates a device information table TB1 representing the performance of various devices of the HMD 100 functioning as an information processing apparatus that creates the AR scenario. The device information table TB1 includes, as the performance of the various devices included in the HMD 100, resolution and an angle of view serving as the performance of the camera 61, a display region and resolution of the image display section 20, a processing ability of the CPU 140, an angle of view and accuracy of a measured distance of the distance sensor 65, and abilities of the ROM 121 and the RAM 122.

The AR-scenario control section 141 also creates a scenario data management table TB2 including conditions serving as triggers of various kinds of processing to be executed such as display of the AR image at the time when the AR scenario is executed and object information such as display of the AR image executed according to order decided according to detection of the conditions. The object information includes data (e.g., the AR image) of processing to be executed and control information necessary for control for executing processing for outputting the data. In other words, the AR scenario includes the scenario data management table TB2 including conditions for implementing order of the various kinds of processing to be executed and the object information. The AR-scenario control section 141 creates, such that control information included in the scenario data management table TB2 in association with the performance of devices included in an apparatus executing the AR scenario can be changed when the AR scenario including the scenario data management table TB2 is executed, the device information table TB1 in association with the control information. Note that the data to be output included in the object information in this specification include, in addition to display of an image, an output of sound, and the like, a state of standby for an input such as a change to a state in which an input of sound is received.

FIG. 4 is an explanatory diagram showing an example of the object information included in the scenario data management table TB2. As shown in FIG. 4, the object information is segmented into display-related execution processing (display relation in FIG. 4), which is processing at the time when the AR scenario is executed explained below, object recognition processing (object recognition in FIG. 4), and UI data output processing (UI in FIG. 4). In the object information, data to be output and control information for outputting the data are associated. In the object information in this embodiment, information related to the performance of the apparatus executing the AR scenario is stored as control information. For example, as one kind of object information, a name of an object is a cap, a type is a 3D model, a coordinate of a feature point serving as the control information is specified as (X1, Y1, Z1), a coordinate of a feature point in the case of display as an image is set and displayed as (X2, Y2, Z2), and a size of a display region in the case of display as an image is displayed as a size of S1 (<1) times when the size of an entire display region is represented as 1. Image data of the 3D model corresponding to the control information is a cap CP shown in a column of the data. The control information is stored as a target of the display relation and the object recognition. Note that "CP" in the data shown in FIG. 4 is a sign shown for convenience of explanation and is not stored as data. Note that, in this embodiment, the control information and the data are stored in association with each other. However, in the other embodiments, the control information and the data may be stored as separate information. In this embodiment, the coordinate of the feature point is stored as a coordinate in a CG (computer graphics) space (a model space). In other embodiments, the coordinate of the feature point may be stored as a coordinate of a space other than the CG space or may be stored as a two-dimensional space. The device information table TB1 includes correspondence information between one pixel in the coordinate of the CG space and a unit area in a coordinate of a real space. Since the device information table TB1 includes the correspondence information, it is possible for other HMDs to determine a relationship of the number of pixels per one millimeter (mm) in the real space or length in the real space per one pixel.

In the object name "display navigation 1" in the display relation shown in FIG. 4, since the type is a character image, a character image of "Please move the cap to . . . " of data is displayed when the AR scenario is being executed. The object recognition shown in FIG. 4 is object recognition concerning data for recognizing an object detected from the image pickup range. In an example of the object name "PET bottle", the object recognition is started when the PET bottle PT serving as the 3D model is detected from the image pickup range. The detection of the PET bottle PT is determined on the basis of the position of a coordinate (X4, Y4, Z4) serving as a feature point. Since the PET bottle PT is not deformed, "fixed" is stored as an object shape change of control information. An error in detecting the PET bottle PT is allowed up to S4 (mm) as allowable recognition accuracy. "After the cap CP attachment", which is a state at an end time, is stored concerning whether the detection of the PET bottle PT from the image pickup range is ended.

In the object name "sound navigation 2" in the UI shown in FIG. 4, "Please move the cap to . . . " stored as data is output as sound stored as the type. A recording time serving as time in which the sound is recorded or time in which the sound is reproduced is stored as S5 (s). In the sound navigation 2, since a link to a substitute text is stored as "present". Therefore, when the apparatus executing the AR scenario does not include a device that outputs sound, data scheduled to be output as sound is displayed as a character image. In the object name "input check 1" in the UI shown in FIG. 4, since the type is "sound recognition", sound "Yes" stored as data is acquired by a device capable of acquiring sound such as microphone when the AR scenario is being executed. In the input recognition 1, a link to input reception is stored as "present". Therefore, when the apparatus executing the AR scenario does not include a device that acquires sound, data scheduled to be input as sound can also be received as operation from another UI such as a keyboard or a mouse.

The AR-scenario control section 141 causes the data storing section 120 to store the created device information table TB1 and the created scenario data management table TB2 in association with each other. Since the AR-scenario control section 141 causes the data storing section 120 to store the device information table TB1 and the scenario data management table TB2 in association with each other, even when there is a difference between the performance of the apparatus in which the AR scenario is executed and the performance of the information processing apparatus that creates the AR scenario, the AR scenario with a deficiency suppressed is executed according to predetermined order. Note that the AR-scenario control section 141 corresponds to the generating section in the appended claims. The data storing section 120 corresponds to the storing section in the appended claims. In this embodiment, the AR scenario is an image scenario.

A-2. AR Scenario Creation Processing

Figure 5:
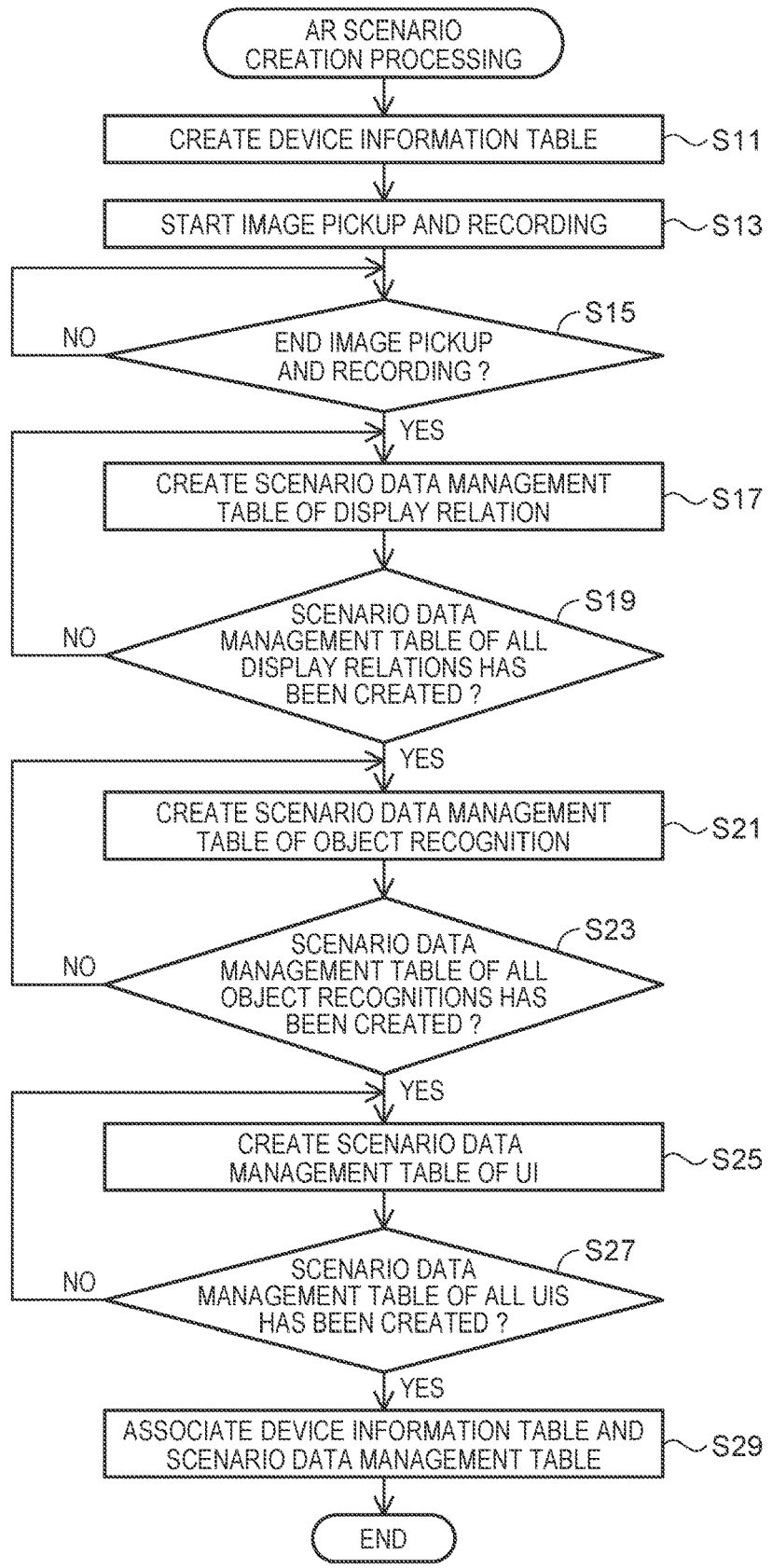
FIG. 5 is a flowchart for explaining a flow of AR scenario creation processing.

FIG. 5 is a flowchart for explaining a flow of AR scenario creation processing. The AR scenario creation processing is processing in which an AR scenario is created by the HMD 100 serving as the information processing apparatus including the camera 61. The AR-scenario control section 141 of the HMD 100 causes the data storing section 120 to store the device information table TB1 and the scenario data management table TB2 in association with each other and creates an AR scenario.

In the AR scenario creation processing, first, the AR-scenario control section 141 creates the device information table TB1 of the HMD 100 functioning as the information processing apparatus that creates the AR scenario (step S11). The AR-scenario control section 141 creates the device information table TB1 concerning the performance of the camera 61, the performance of the distance sensor 65, the performance of the microphone 69, and the performance of the ROM 121 and the RAM 122 in the HMD 100 and the UI associated with the HMD 100. Examples of the performance of these devices include resolution of the camera 61, an angle of view and internal parameters of the camera 61, and accuracy of depth measured as a distance to a target of an object in the image pickup range of the distance sensor 65. Note that the internal parameters of the camera 61 are a focal length represented as the number of pixels on the basis of lengths in the respective lateral and longitudinal directions per one pixel of an image sensor included in the camera 61 (or pixel densities in the respective directions) and a focal length of the camera 61 and a center coordinate of the image sensor at the time when a crossing point of the optical axis of the camera 61 and the image sensor is set as the origin.

After creating the device information table TB1, the AR-scenario control section 141 starts image pickup of an outside scene by the camera 61 and recording, which is acquisition of external sound, by the microphone 69 for creating an AR scenario (step S13). In this embodiment, the AR-scenario control section 141 creates an AR scenario for causing the user US wearing the HMD 100 to attach the cap CP to the PET bottle PT not attached with the cap CP as shown in FIG. 2.

Figure 6:
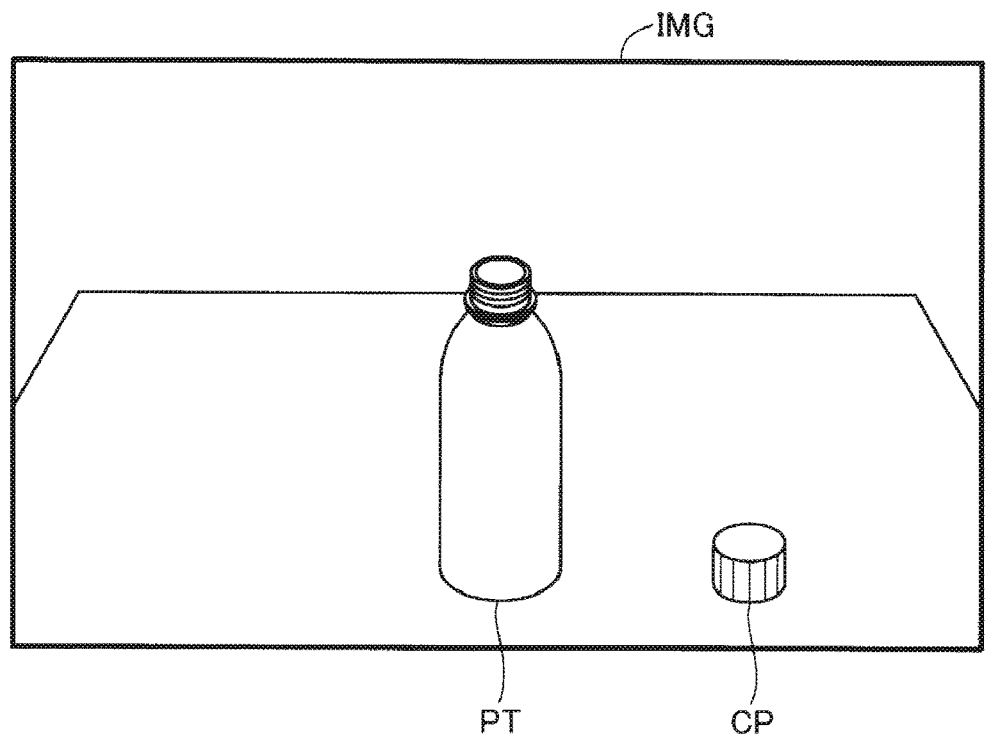
FIG. 6 is an explanatory diagram showing the picked-up image of the camera at the time when a user creates an AR scenario.
Figure 7:
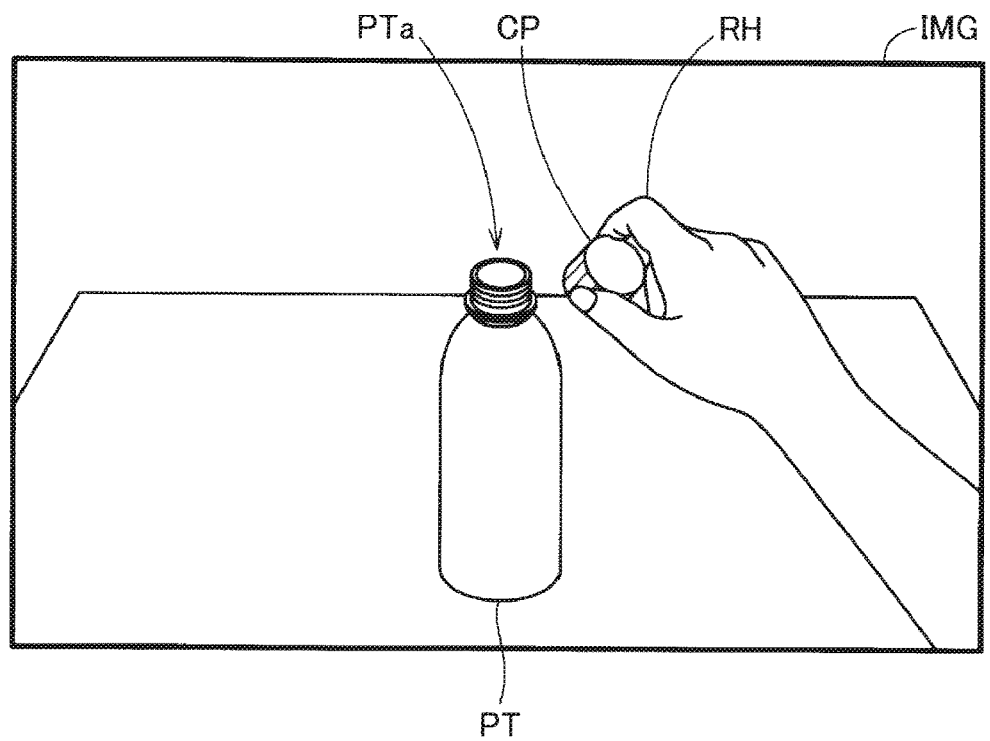
FIG. 7 is an explanatory diagram showing the picked-up image of the camera at the time when the user creates the AR scenario.
Figure 8:
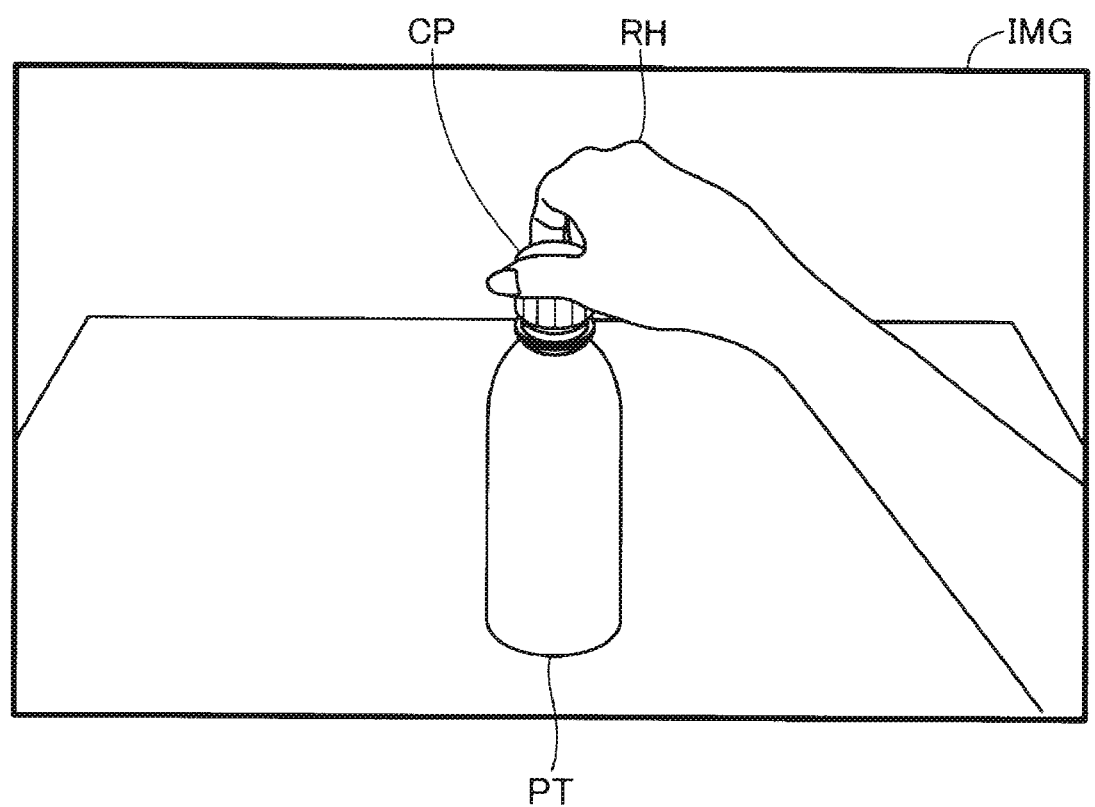
FIG. 8 is an explanatory diagram showing the picked-up image of the camera at the time when the user creates the AR scenario.

FIGS. 6 to 8 are explanatory diagrams for explaining a picked-up image IMG of the camera 61 at the time when the user US creates an AR scenario. In FIGS. 6 to 8, as shown in FIG. 2, the picked-up image IMG in a moving image picked up by the camera 61 of the mounted HMD 100 at the time when the user US attaches the cap CP to the PET bottle PT as shown in FIG. 2. In this embodiment, the angle of view of the camera 61 is set such that the picked-up image IMG of the camera 61 of the user US wearing the image display section 20 is in a range same as a visual field of the user US.

In FIG. 6, the picked-up image IMG obtained by picking up images of the PET bottle PT and the cap CP not attached to each other is shown. In this embodiment, an AR scenario is created in which the user US attaches the cap CP not attached to the PET bottle PT to the PET bottle PT.

In FIG. 7, the picked-up image IMG is shown in a halfway state in which the user US holds the cap CP with a right hand RH and attempts to move the cap CP to an opening PTa, which is a place where the cap CP is attached in the PET bottle PT, in order to attach the cap CP to the PET bottle PT. In this embodiment, when moving the cap CP to the opening PTa of the PET bottle PT as shown in FIG. 7, the user US utters "Please move the cap to the position of the opening". Therefore, the microphone 69 of the HMD 100 acquires the utterance of the user US as external sound.

In FIG. 8, the picked-up image IMG is shown in a state in which, after moving the cap CP to the opening PTa of the PET bottle PT, the user US is turning, centering on the center axis of the opening PTa of the PET bottle PT, the cap CP in the clockwise direction (in the following explanation, simply referred to as "clockwise" as well) when viewed from above.

After the processing in step S13 in FIG. 5 is performed, the operation section 135 stands by for reception of predetermined operation for ending the image pickup and the recording (step S15). If the predetermined operation for ending the image pickup and the recording is not received (NO in step S15), the AR-scenario control section 141 continues to execute the image pickup and the recording for creating an AR scenario and stands by for reception of the predetermined operation (step S13). In the processing in step S15, after the user attaches the cap CP to the PET bottle PT and further turns the cap CP to fix the cap CP to the PET bottle PT, if the operation section 135 receives the predetermined operation (YES in step S15), the AR-scenario control section 141 ends the image pickup and the recording.

After ending the image pickup and the recording for creating an AR scenario, the AR-scenario control section 141 creates the scenario data management table TB2 of the display relation on the basis of a picked-up image (step S17). In this embodiment, the AR-scenario control section 141 creates, according to elapse of time, the data shown in FIG. 4 for the object subjected to the image pickup and the sound acquired by the recording, respectively. For example, concerning a movement of the cap CP, the unnecessary-image erasing section 149 deletes an image of the right hand RH of the user US recognized as an unnecessary image from the picked-up image. Thereafter, the AR-image extracting section 151 creates, on the basis of an image of the cap CP in a state in which an image of the right hand RH is not picked up, an image of a portion of the cap CP held by the right hand RH and not subjected to image pickup. The AR-scenario control section 141 performs edge detection and the like on the cap CP subjected to the image pickup to automatically set the feature point, the display position, and the size of the display region shown in FIG. 4. The operation section 135 receives the predetermined operation, whereby the AR-scenario control section 141 can change the feature point, the display position, and the size of the display region. The AR-scenario control section 141 can also delete and add, for example, an image of a specific mark determined by the user as unnecessary with respect to the created data of the cap CP. The AR-scenario control section 141 can change the order of execution of an AR scenario by changing an anterior and posterior relation of the respective kinds of processing.

After the processing in step S17 in FIG. 5, the AR-scenario control section 141 determines whether the scenario data management table TB2 of all display relations for the object included in the picked-up image has been created (step S19). If it is determined that the scenario data management table TB2 of all the display relations has not been created (NO in step S19), the AR-scenario control section 141 continuously creates the scenario data management table TB2 of display relations not created yet. In other words, when there is data of display relations not created yet, the AR-scenario control section 141 creates the scenario data management table TB2 concerning the data. In this embodiment, after creating the scenario data management table TB2 in which the object name is "cap" shown in FIG. 4, the AR-scenario control section 141 creates the scenario data management table TB2 of the display relation of "display navigation 1" shown in FIG. 4 not created as the scenario data management table TB2 yet. The AR-scenario control section 141 creates the data shown in FIG. 4 as the display image on the basis of the recorded sound "Please move the cap to the position of the opening". In this embodiment, the operation section 135 receives operation from the user, whereby the AR-scenario control section 141 creates a character image replacing a picked-up image of the cap CP with respect to the "opening", which is a part in the created data.

If it is determined in the processing in step S19 of FIG. 5 that the scenario data management table TB2 of all the display relations has been created (YES in step S19), subsequently, the AR-scenario control section 141 creates the scenario data management table TB2 of the object recognition (step S21). In this embodiment, the AR-scenario control section 141 detects the PET bottle PT, which is a stationary object, from a picked-up image at the time when the AR scenario is executed and creates object information of the scenario data management table TB2 serving as a target of the object recognition. The operation section 135 receives the predetermined operation, whereby the AR-scenario control section 141 selects a target of the object recognition out of the picked-up image of the camera 61. Since individual objects are separated and recognized by the object recognizing section 143, when the operation section 135 is operated and a part of the PET bottle PT in the picked-up image is selected, the AR-scenario control section 141 selects the entire PET bottle PT as a target of the object recognition. Since there is no shape change in the PET bottle PT subjected to the image pickup by the camera 61, the AR-scenario control section 141 automatically sets the object shape change shown in FIG. 4 as "fixed". The AR-scenario control section 141 automatically sets, as the allowable recognition accuracy shown in FIG. 4, a dimension proportional to the size of the PET bottle PT subjected to the image pickup. In this embodiment, the image pickup ends after the cap CP is attached to the opening PTa of the PET bottle PT and turned clockwise. Therefore, the operation section 135 receives the predetermined operation, whereby the AR-scenario control section 141 sets the state at the end time shown in FIG. 4 as "after cap attachment". Note that the cap CP and the PET bottle PT correspond to the specific target in the appended claims.

After the processing in step S21 in FIG. 5, the AR-scenario control section 141 determines whether the scenario data management table TB2 of all the object recognitions has created (step S23). If it is determined that the scenario data management table TB2 of all the object recognitions has not been created (NO in step S23), the AR-scenario control section 141 continues to create the scenario data management table TB2 of the remaining object recognitions (step S21).

If it is determined in the processing in step S23 that the scenario data management table TB2 of all the object recognitions has been created (YES in step S23), subsequently, the AR-scenario control section 141 creates the scenario data management table TB2 of the UI (step S25). In this embodiment, the scenario data management table TB2 of the object recognition to be created is only the data in which the object information of "cap CP" and the data of "PET bottle" shown in FIG. 4. There is no other scenario data management table TB2 to be created. Therefore, the AR-scenario control section 141 performs the processing in step S25. The AR-scenario control section 141 creates the "sound navigation 2" shown in FIG. 4 as object information of the scenario data management table TB2 of the UI. The AR-scenario control section 141 creates, on the basis of the recorded sound "Please move the cap to the position of the opening", the data shown in FIG. 4 output as sound when the AR scenario is being executed. In this embodiment, the operation section 135 receives the predetermined operation and the microphone 69 acquires predetermined sound, whereby the AR-scenario control section 141 creates sound data in which the "opening", which is a part of the recorded sound, is replaced with the "AR image". In this embodiment, when the object information of the scenario data management table TB2 of the UI is created, the operation section 135 receives the predetermined operation and designates two points before and after the "opening" at the time when the recorded sound is reproduced, whereby the AR-scenario control section 141 can replace sound present between the two points with other sound. When the object information of the UI is created, since the microphone 69 acquires sound "AR image" anew, the AR-scenario control section 141 can replace the recorded "opening" with the sound "AR image" acquired anew. In this embodiment, examples of the object information of the scenario data management table TB2 created by the AR-scenario control section 141 include the data shown in FIG. 4. The operation section 135 receives the predetermined operation, whereby, when the apparatus executing the AR scenario does not include a device that can output the created sound data as sound, the AR-scenario control section 141 sets the link to the substitute text shown in FIG. 4 serving as setting of substitute means for displaying a character image to "present".

After the processing in step S25 in FIG. 5, the AR-scenario control section 141 determines whether the scenario data management table TB2 of all the UIs has been created (step S27). If it is determined that the scenario data management table TB2 of all the UIs has not been created (NO in step S27), the AR-scenario control section 141 continues to create the scenario data management table TB2 of the remaining UIs (step S25). In this embodiment, after creating data of the object name "sound navigation 2" shown in FIG. 4 as the scenario data management table TB2 of the UI, the AR-scenario control section 141 creates data of the UI of "input check" shown in FIG. 4 as the scenario data management table TB2 not created yet. The operation section 135 receives the predetermined operation, whereby the AR-scenario control section 141 creates the object information of the scenario data management table TB2 of the "input check 1" shown in FIG. 4. The "input check 1" is sound data of "Yes" input when the user ends an operation conforming to the AR scenario when the AR scenario is being executed. In this embodiment, since data set as the input check 1 is sound data, when a device that acquires sound is not provided in the apparatus that executes the AR scenario, the AR-scenario control section 141 sets the link of the input reception shown in FIG. 4 to "present" such that another UI such as a keyboard can detect operation.

If it is determined in the processing of step S27 in FIG. 5 that the scenario data management table TB2 of all the UIs has been created (YES in step S27), subsequently, the AR-scenario control section 141 causes the data storing section 120 to store the AR scenario associated with the created device information table TB1 and the created scenario data management table TB2 (step S29). The CPU 140 ends the AR creation scenario processing.

As explained above, in the HMD 100 in this embodiment, the data storing section 120 stores the device information table TB1 representing the performance of the various devices of the HMD 100 functioning as the information processing apparatus that creates the AR scenario including the AR image. The data storing section 120 stores, in association with the device information table TB1, the scenario data management table TB2 including a condition serving as a trigger of, for example, display of the AR image at the time when the AR scenario is executed and the object information executed according to the order decided according to detection of the condition. To enable the control information included in the scenario data management table TB2 to be changed according to the performance of the devices included in the apparatus executing the AR scenario when the AR scenario is executed, the device information table TB1 is stored in association with the control information. Therefore, when the AR scenario stored in the data storing section 120 of the HMD 100 in this embodiment is executed by another apparatus, the apparatus can refer to the device information table TB1 concerning devices necessary for the AR scenario stored in the data storing section 120 to be executed. By referring to the device information table TB1, the apparatus executing the AR scenario can execute, according to predetermined order, the AR scenario with a deficiency suppressed even if there is a difference in performance between the apparatus executing the AR scenario and the various devices stored in the device information table TB1. Examples of the deficiency include a decrease in processing speed, a problem of resolution, accuracy of a distance to an object to be recognized, and UIs corresponding to the other apparatus.

In the HMD 100 in this embodiment, the AR-scenario control section 141 creates an AR scenario including the device information table TB1 and the scenario data management table TB2. The device information table TB1 is information representing the performance of the devices of the HMD 100 functioning as the information processing apparatus that creates the AR scenario. Therefore, in the HMD 100 in this embodiment, when the AR scenario is created, the device information table TB1 is easily created.

In the HMD 100 in this embodiment, in one kind of processing included in the created AR scenario, an image is created to be displayed in association with the position of the object detected out of the picked-up image of the camera 61. Therefore, in the HMD 100 in this embodiment, the AR image included in the AR scenario is created out of the image pickup range of the camera 61. Therefore, the user can create the AR scenario simply by picking up an image of the object that the user desires to create as the AR image. Convenience of use for the user in creating the AR scenario is improved.

In the HMD 100 in this embodiment, the information concerning the performance of the camera 61 is included in the device information table TB1. It is possible to suppress a deficiency of a display image during the AR scenario execution due to a difference between the performance of the image display section of the apparatus that executes the AR scenario and the performance of the camera 61 in the device information table TB1.

In the HMD 100 in this embodiment, the device information table TB1 includes the performance such as the angle of view and the accuracy of a measured distance of the distance sensor 65 that measures a distance to the object in the image pickup range. Therefore, in the HMD 100 in this embodiment, the AR image including the distance to the object included in the image pickup range of the distance sensor 65 is automatically created. The AR image based on the information concerning the distance is created. Therefore, the user can easily generate an AR scenario including a stereoscopic AR image. Convenience of use for the user in creating the AR scenario is improved.

In the HMD 100 in this embodiment, the AR scenario includes the UI data output processing for outputting sound. The device information table TB1 includes the information concerning the performance of the devices necessary for performing the UI data output processing for outputting sound. Therefore, in the HMD 100 in this embodiment, in addition to the processing of the image display included in the AR scenario, the processing of the sound output is also included. Therefore, convenience for the user is improved.

B. Second Embodiment

B-1. Configuration of an Apparatus that Executes an AR Scenario

Figure 9:
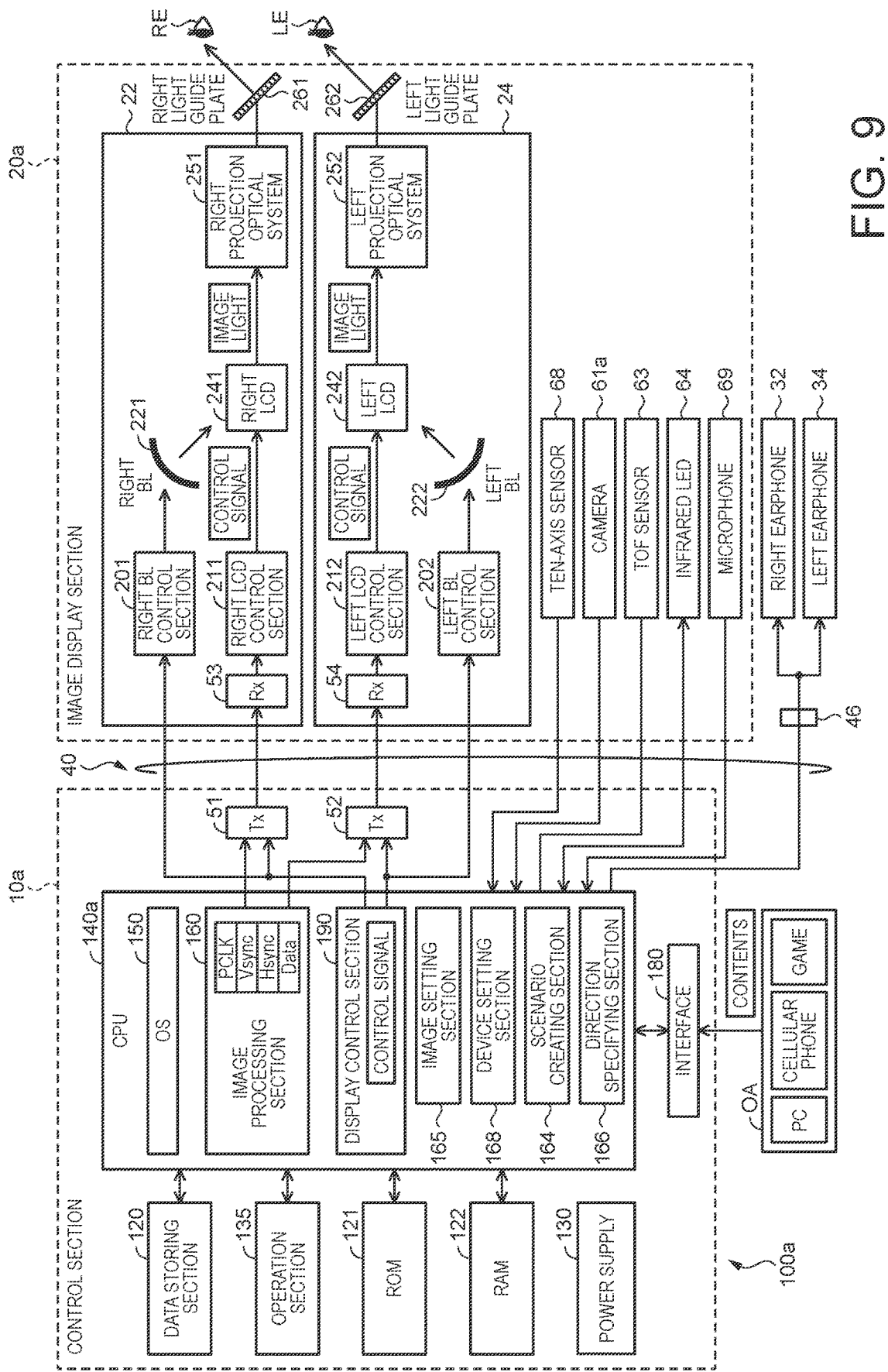
FIG. 9 is a block diagram functionally showing the configuration of an HMD functioning as an apparatus that executes an AR scenario in a second embodiment.

FIG. 9 is a block diagram functionally showing the configuration of an HMD 100a functioning as an apparatus that executes an AR scenario in a second embodiment. The HMD 100a in the second embodiment is different from the HMD 100 in the first embodiment in that an image display section 20a includes a ten-axis sensor 66, a CPU 140a of a control section 10a includes a device setting section 168, a direction specifying section 166, and an image setting section 165. The other configuration of the HMD 100a are the same as the configuration of the HMD 100 in the first embodiment. Note that, in FIG. 9, the AR-scenario control section 141, the object tracking section 142, the object recognizing section 143, the 3D-model generating section 144, the sensor control section 145, the UI control section 146, the AR-scenario-operation setting section 147, the additional-information acquiring section 148, the unnecessary-image erasing section 149, and the AR-image extracting section 151 which are shown in FIG. 3 in the first embodiment are collectively shown as a scenario creating section 164. In FIG. 9, a function for generating a virtual image in the image display section 20a and a function related to the generation of the virtual image included in the CPU 140a, which are not shown in FIG. 3, are shown.

The ten-axis sensor 66 is a sensor that detects acceleration (three axes), angular velocity (three axes), terrestrial magnetism (three axes), and atmospheric pressure (one axis). The ten-axis sensor 66 is incorporated near the right display driving section 22 in the image display section 20a. When the image display section 20a is worn on the head of a user, the ten-axis sensor 66 detects the movement and the position of the head of the user.

As shown in FIG. 9, the control section 10a includes the data storing section 120, the operation section 135, the ROM 121, the RAM 122, the power supply 130, the interface 180, the CPU 140a, a transmitting section 51 (Tx 51), and a transmitting section 52 (Tx 52). The CPU 140a reads out a computer program stored in the ROM 121 and executes writing in the RAM 122 to thereby function as an operating system 150 (OS 150), a display control section 190, an image processing section 160, the image setting section 165, the device setting section 168, the scenario creating section 164, and the direction specifying section 166.

The display control section 190 generates a control signal for controlling the right display driving section 22 and the left display driving section 24. Specifically, the display control section 190 individually controls, according to control signals, driving ON/OFF of the right LCD 241 by a right LCD control section 211, driving ON/OFF of a right backlight 221 by a right backlight control section 201, driving ON/OFF of the left LCD 242 by a left LCD control section 212, driving ON/OFF of a left backlight 222 by a left backlight control section 202, and the like. Consequently, the display control section 190 controls generation and emission of image light respectively by the right display driving section 22 and the left display driving section 24. For example, the display control section 190 causes both of the right display driving section 22 and the left display driving section 24 to generate image lights, causes only one of the right display driving section 22 and the left display driving section 24 to generate image light, or does not cause both of the right display driving section 22 and the left display driving section 24 to generate image lights.

The display control section 190 transmits control signals to the right LCD control section 211 and the left LCD control section 212 respectively via the transmitting sections 51 and 52. The display control section 190 transmits control signals respectively to the right backlight control section 201 and the left backlight control section 202.

The image processing section 160 acquires an image signal included in contents and an image signal included in an AR scenario. The image processing section 160 separates synchronization signals such as a vertical synchronization signal VSync and a horizontal synchronization signal HSync from the acquired image signals. The image processing section 160 generates a clock signal PCLK using a PLL (Phase Locked Loop) circuit or the like (not shown in the figure) according to cycles of the separated vertical synchronization signal VSync and horizontal synchronization signal HSync. The image processing section 160 converts an analog image signal, from which the synchronization signals are separated, into a digital image signal using an A/D conversion circuit or the like (not shown in the figure). Thereafter, the image processing section 160 stores the digital image signal after the conversion in a DRAM in the data storing section 120 frame by frame as image data (RGB data) of a target image. Note that the image processing section 160 may execute, on the image data, image processing such as resolution conversion processing, various kinds of tone correction processing such as adjustment of luminance and chroma, and keystone correction processing according to necessity.

The image processing section 160 transmits the clock signal PCLK, the vertical synchronization signal VSync, and the horizontal synchronization signal HSync generated by the image processing section 160 and the image data stored in the DRAM respectively via the transmitting sections 51 and 52. Note that the image data transmitted via the transmitting section 51 is referred to as "image data for right eye" as well. The image data transmitted via the transmitting section 52 is referred to as "image data for left eye" as well. The transmitting sections 51 and 52 function as a transceiver for serial transmission between the control section 10 and the image display section 20.

The direction specifying section 166 calculates changes in the position and the direction of the image display section 20*a* on the basis of acceleration and the like detected by the ten-axis sensor 66. The calculated changes in the position and the direction of the image display section 20*a* are used by the device setting section 168 explained below for, for example, correction of a display position of an image displayed on the image display section 20*a*.

The device setting section 168 creates an executing apparatus information table TB3 representing the performance of various devices (e.g., the camera 61) included in the HMD 100*a* that executes an AR scenario. The device setting section 168 acquires an AR scenario including the device information table TB1 and the scenario data management table TB2 stored in the data storing section 120. The device setting section 168 compares the created executing apparatus information table TB3 and the acquired device information table TB1 of the AR scenario. The device setting section 168 determines whether, among the various devices included in the HMD 100*a* necessary for executing the AR scenario, there is a device having performance different from the performance of the devices included in the device information table TB1 of an information processing apparatus that creates the AR scenario to be executed. When determining that the HMD 100*a* includes a device having performance different from the performance of the devices included in the device information table TB1, the device setting section 168 changes data of the scenario data management table TB2 associated with the device information table TB1. Details are explained below. As the change of the data, for example, when the resolution of the camera 61 of the information processing apparatus that creates the AR scenario is higher than the resolution of a camera 61*a* of the HMD 100*a* that executes the AR scenario, after reducing resolution included in control information of the object information included in the scenario data management table TB2, the device setting section 168 causes the image display section 20*a* to display an image based on the data. In other words, the device setting section 168 changes control information of the scenario management table TB2 of the executed AR scenario according to a difference between the device information table TB1 of the executed AR scenario and the executing apparatus information table TB3 of the HMD 100*a* that executes the AR scenario. Note that the device setting section 168 corresponds to the information acquiring section and the control-information changing section in the appended claims. The camera 61*a* corresponds to the second image pickup section in the appended claims.

The image setting section 165 performs various kinds of setting of an image that the image setting section 165 causes the image display section 20*a* to display (a display image). For example, the image setting section 165 sets a display position of the display image, a size of the display image, luminance of the display image, and the like and sets image data for right eye and image data for left eye to form a parallax in order to cause the user to stereoscopically visually recognize the display image. In the second embodiment, an angle of view of the camera 61*a* is set to be the same as a visual field at the time when the user wearing the image display section 20*a* is looking forward. Therefore, the image setting section 165 can cause the image display section 20*a* to display an AR image included in an AR scenario in association with the position of an object detected out of a picked-up image by the device setting section 168.

B-2. AR Scenario Execution Processing

Figure 10:
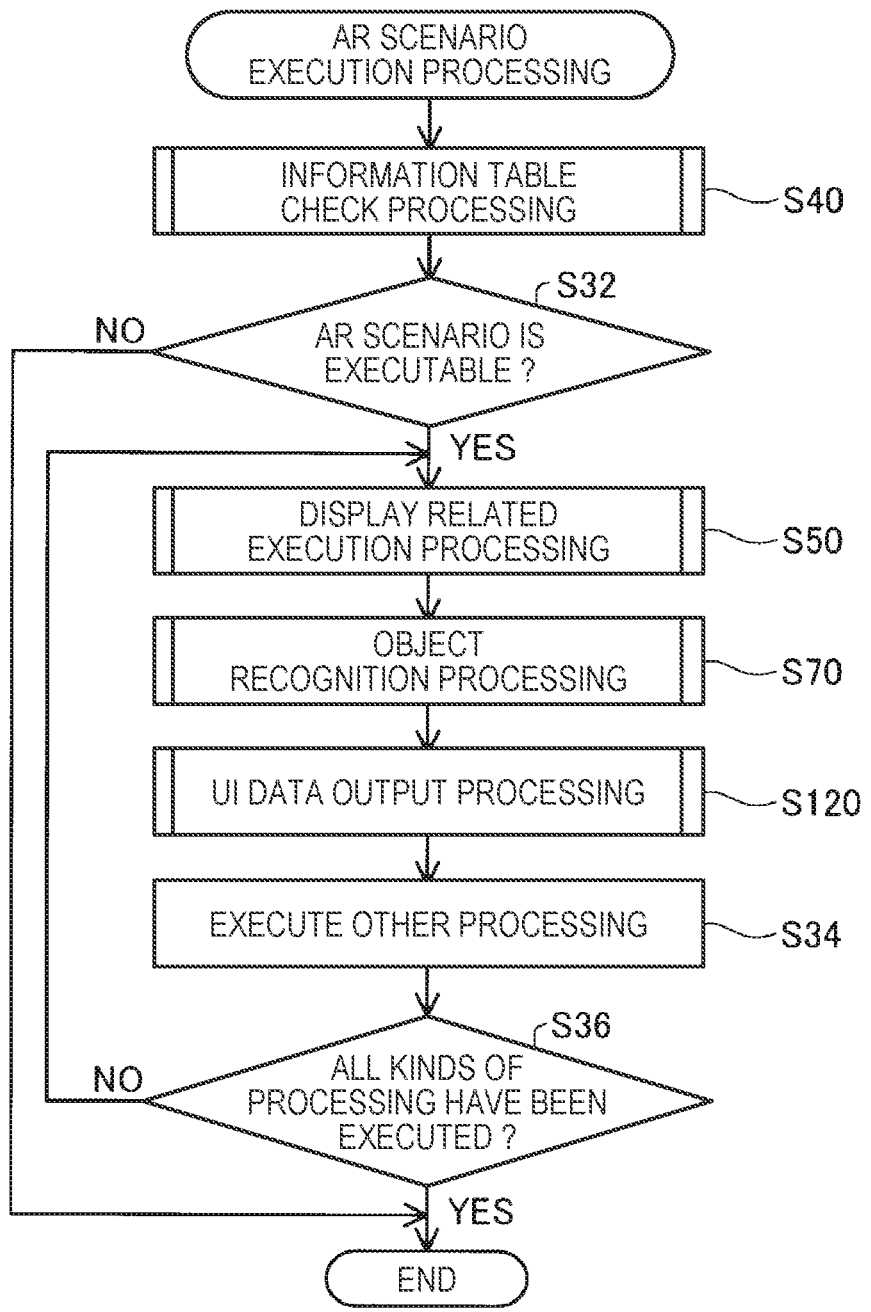
FIG. 10 is a flowchart for explaining a flow of AR scenario execution processing.

FIG. 10 is a flowchart for explaining a flow of AR scenario execution processing. The AR scenario execution processing is processing in which the CPU 140*a* of the HMD 100*a* executes an AR scenario stored in the data storing section 120, whereby an AR image and sound included in the AR scenario are output. In the AR scenario execution processing, first, the device setting section 168 performs information table check processing for creating or checking the executing apparatus information table TB3 of the HMD 100*a* that executes an AR scenario (step S40).

Figure 11:
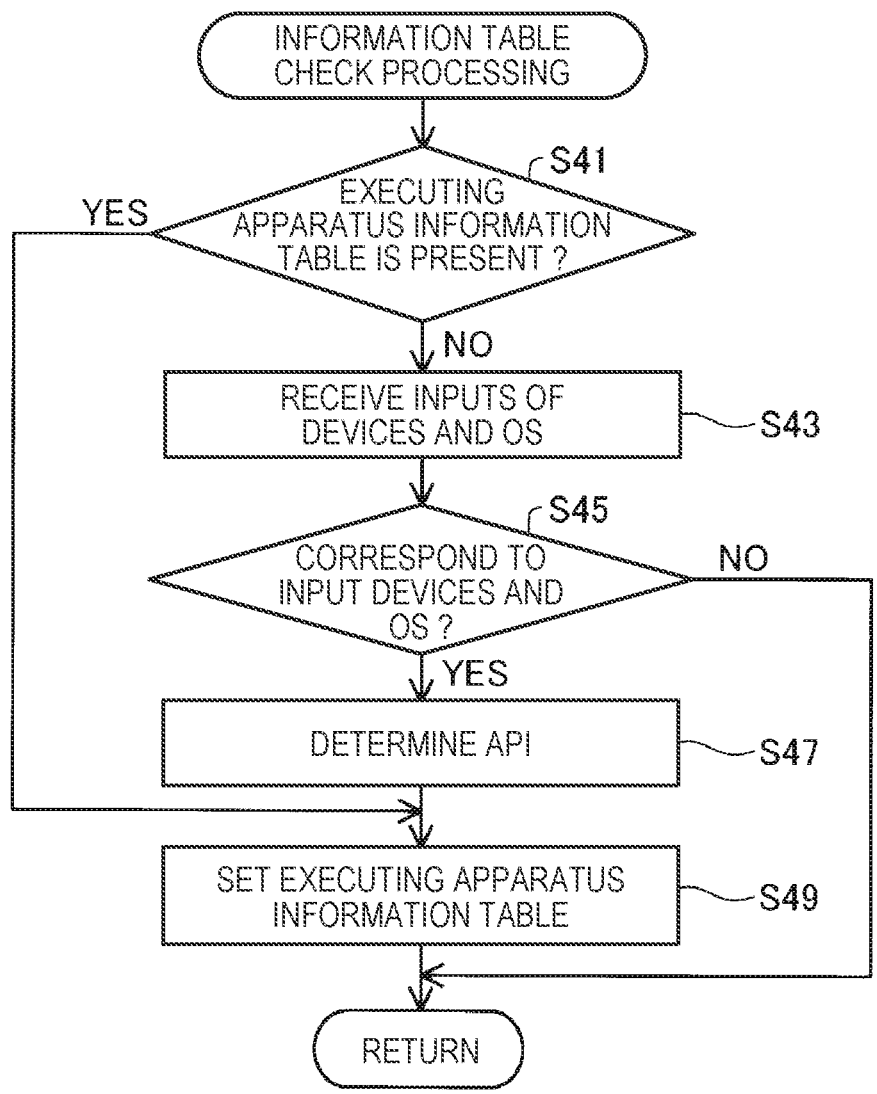
FIG. 11 is a flowchart for explaining a flow of information table check processing.

FIG. 11 is a flowchart for explaining a flow of the information table check processing. In the information table check processing, first, the device setting section 168 determines whether there is the executing apparatus information table TB3 of the HMD 100*a* functioning as an executing apparatus that executes an AR scenario (step S41). In the HMD 100*a*, if an AR scenario is not executed in the past and the HMD 100*a* does not include the executing apparatus information table TB3 (NO in step S41), the device setting section 168 receives, with the operation section 135, inputs information of devices and an OS of the HMD 100*a* serving as information necessary for executing the AR scenario (step S43). The device setting section 168 urges the user to perform an input via the operation section 135 by causing the image display section 20*a* to display a predetermined operation screen. Subsequently, the device setting section 168 determines whether the AR scenario about to be executed corresponds to the devices and the OS input to the device setting section 168 (step S45). If it is determined that the AR scenario about to be executed corresponds to the devices and the OS input to the device setting section 168 (YES in step S45), the device setting section 168 sets an application program interface (API) for executing the AR scenario (step S47). Thereafter, the device setting section 168 sets the executing apparatus information table TB3 corresponding to the AR scenario about to be executed (step S49) and ends the information table check processing.

If the AR scenario is already executed in the processing in step S41, the HMD 100*a* includes the executing apparatus information table TB3 corresponding to the AR scenario about to be executed (YES in step S41). Therefore, the device setting section 168 sets, as the executing apparatus information table TB3 for executing the AR scenario, the executing apparatus information table TB3 already included in the HMD 100*a* (step S49). If it is determined in the processing in step S45 that the devices and the OS input to the device setting section 168 do not correspond to the AR scenario about to be executed (NO in step S45), the device setting section 168 does not create the executing apparatus information table TB3. The CPU 140*a* ends the information table check processing.

When the information table check processing ends (step S40 in FIG. 10), the device setting section 168 determines whether the AR scenario subjected to the information table check processing is executable by the HMD 100a (step S32). If it is determined that the AR scenario is not executable (NO in step S32), the CPU 140a ends the AR scenario execution processing. If it is determined that the AR scenario is executable (YES in step S32), the CPU 140a performs display-related execution processing for causing the image display section 20a to display an image (step S50).

Figure 12:
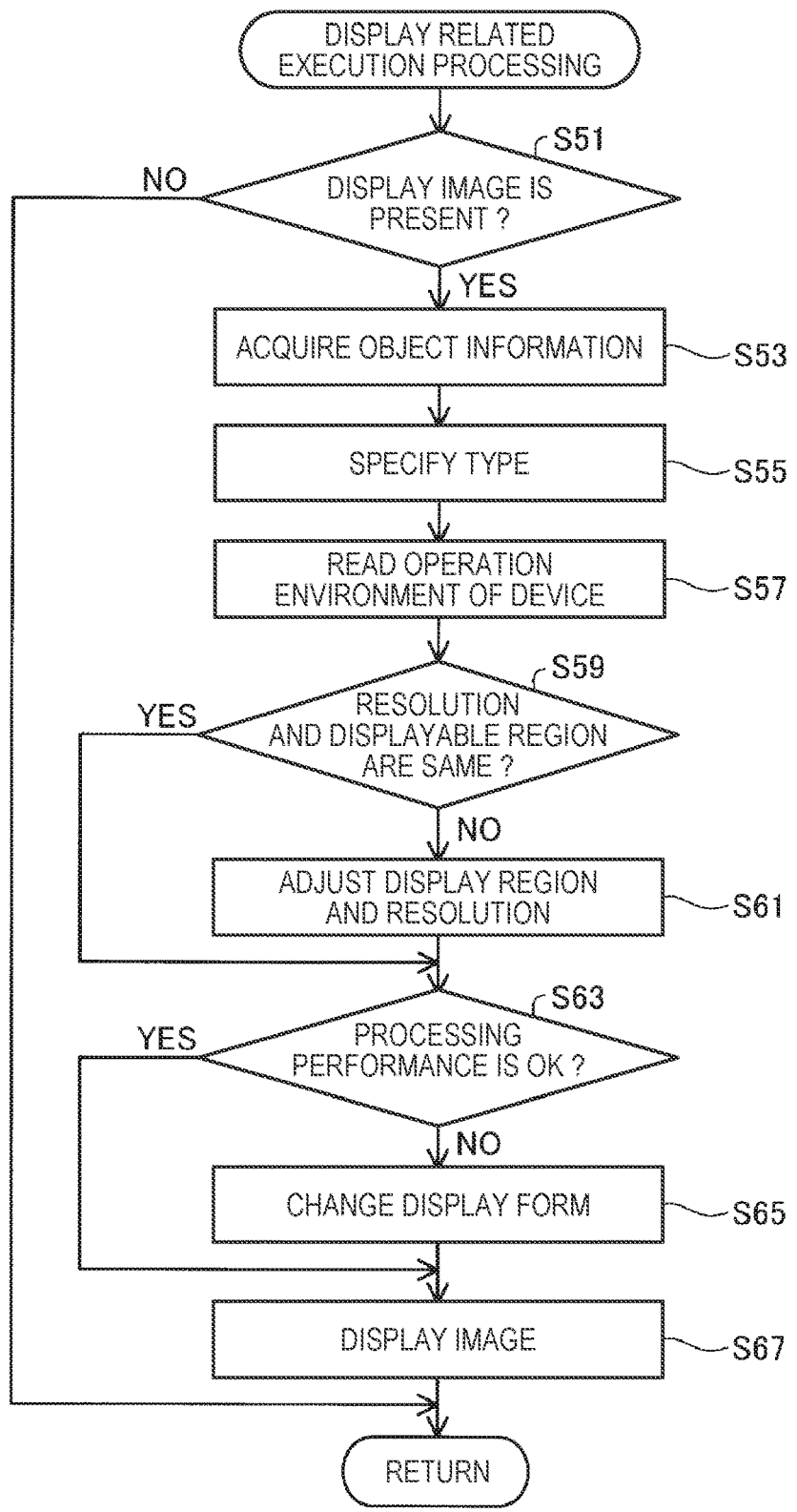
FIG. 12 is a flowchart for explaining a flow of display-related execution processing.

FIG. 12 is a flowchart for explaining a flow of the display-related execution processing. In the display-related execution processing, first, the device setting section 168 determines whether an AR scenario to be executed includes a display image such as an AR image that device setting section 168 causes the image display section 20a to display (step S51). If it is determined that the AR scenario to be executed does not include display image data (NO in step S51), the CPU 140a ends the display-related execution processing without causing the image display section 20a to display an image.

If it is determined in the processing in step S51 that the AR scenario to be executed includes a display image (YES in step S51), the device setting section 168 acquires object information (e.g., FIG. 4) of the scenario data management table TB2 of the display image (step S53). The device setting section 168 specifies a type of the display image from the acquired object information (step S55). Subsequently, the device setting section 168 reads an operation environment of a device for displaying an image in the created executing apparatus information table TB3 and an operation environment of a device for displaying an image in the device information table TB1 of an information processing apparatus that has created the AR scenario to be executed (step S57). Thereafter, the device setting section 168 compares the read operation environments to determine whether a displayable region where the image is displayable and the resolution of the image stored as data of the object information and a displayable region where the image display section 20a can display the image and the resolution of the image stored in the created executing apparatus information table TB3 are the same. In other words, the device setting section 168 determines whether the size and the resolution of a display stored in the control information of the scenario data management table TB2 and the size and the resolution of a display of the image display section 20a are the same.

If it is determined that at least one of the displayable regions and the resolutions are not the same (NO in step S59), the device setting section 168 changes the display region and the resolution in displaying the display image on the image display section 20a (step S61). As the change of the display region and the resolution of the image, for example, when the displayable region of the image display section 20a executing the AR scenario is small and the resolution is low, the device setting section 168 reduces a display region of an image based on the display image and curtails pixels of the display image to reduce the resolution.

After performing the processing in step S61, the device setting section 168 determines whether processing performance for displaying an image of the HMD 100a executing the AR scenario is equal to or higher than processing performance stored in the device information table TB1 (step S63). If it is determined in the processing in step S59 that the displayable region and the resolution in the device information table TB1 and the displayable region and the resolution in the executing apparatus information table TB3 are the same, the device setting section 168 performs the processing in step S63 without performing the processing in step S61.

If it is determined that the processing performance for displaying an image of the HMD 100a is not equal to or higher than the processing performance stored in the device information table TB1 (NO in step S63), the device setting section 168 changes a display form in causing the image display section 20a to display the display image (step S65). Examples of the processing performance for displaying an image referred to in step S63 and step S65 include MIPS (million instructions per second) representing a capacity of a memory and processing speed of a computer. Examples of a method of changing the display form include a method in which the device setting section 168 curtails a part of data of the display image, increases a frame rate when the display image is a moving image, or displays only a portion of an outer frame of the display image.

When the processing in step S65 is performed, the image setting section 165 causes the image display section 20a to display an image based on the display image data changed by the device setting section 168 (step S67). The CPU 140a ends the display-related execution processing. If it is determined in the processing in step S63 that the processing performance for displaying an image of the HMD 100a is equal to or higher than the processing performance stored in the device information table TB1 (YES in step S63), the device setting section 168 causes the image display section 20a to display the display image without changing the display form of the display image.

When the display-related execution processing in step S50 in FIG. 10 ends, the device setting section 168 executes object recognition processing for detecting an object related to the AR scenario from the image pickup range in which the HMD 100a executing the AR scenario is performing the image pickup (step S70).

Figure 13:
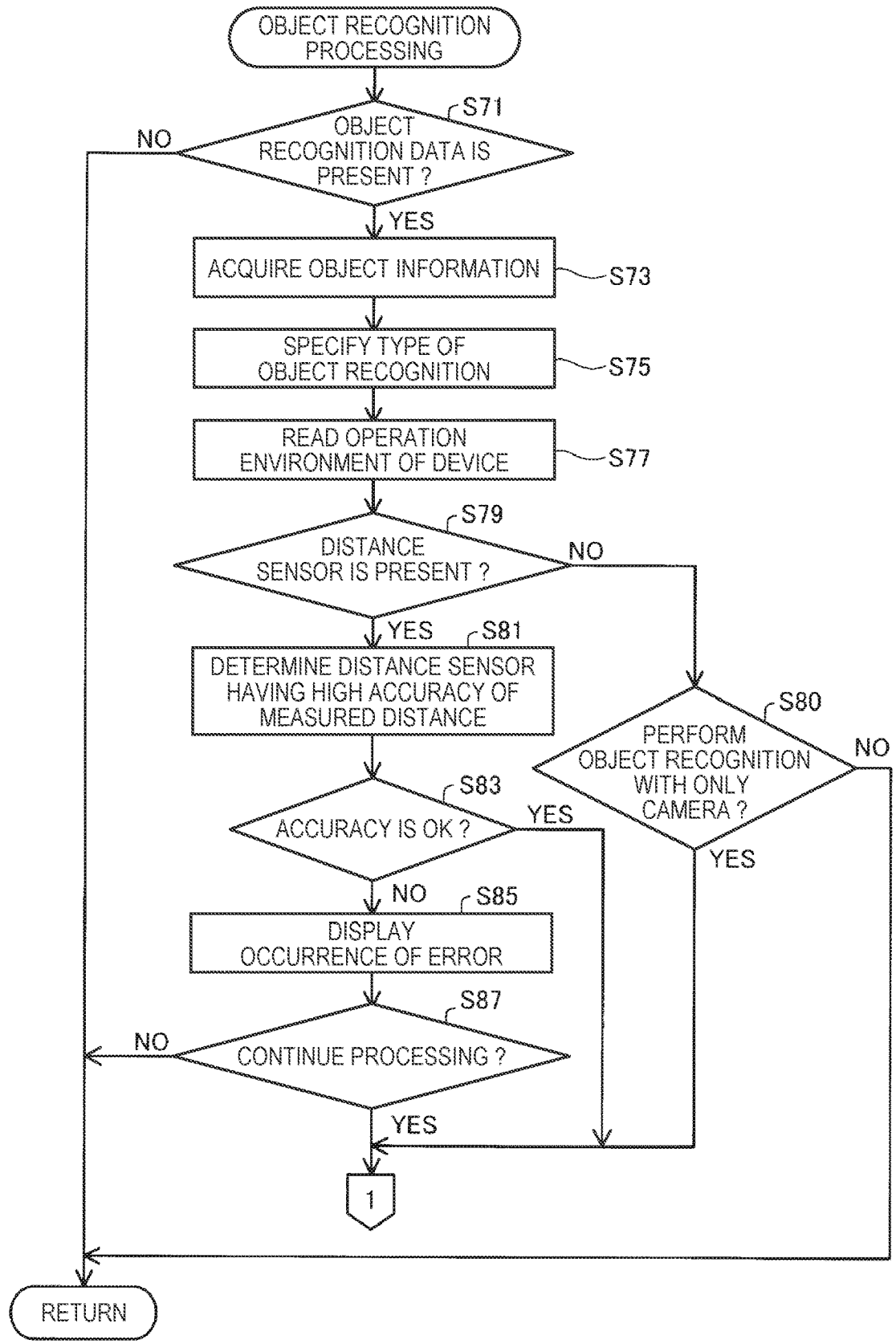
FIG. 13 is a flowchart for explaining a flow of object recognition processing.
Figure 14:
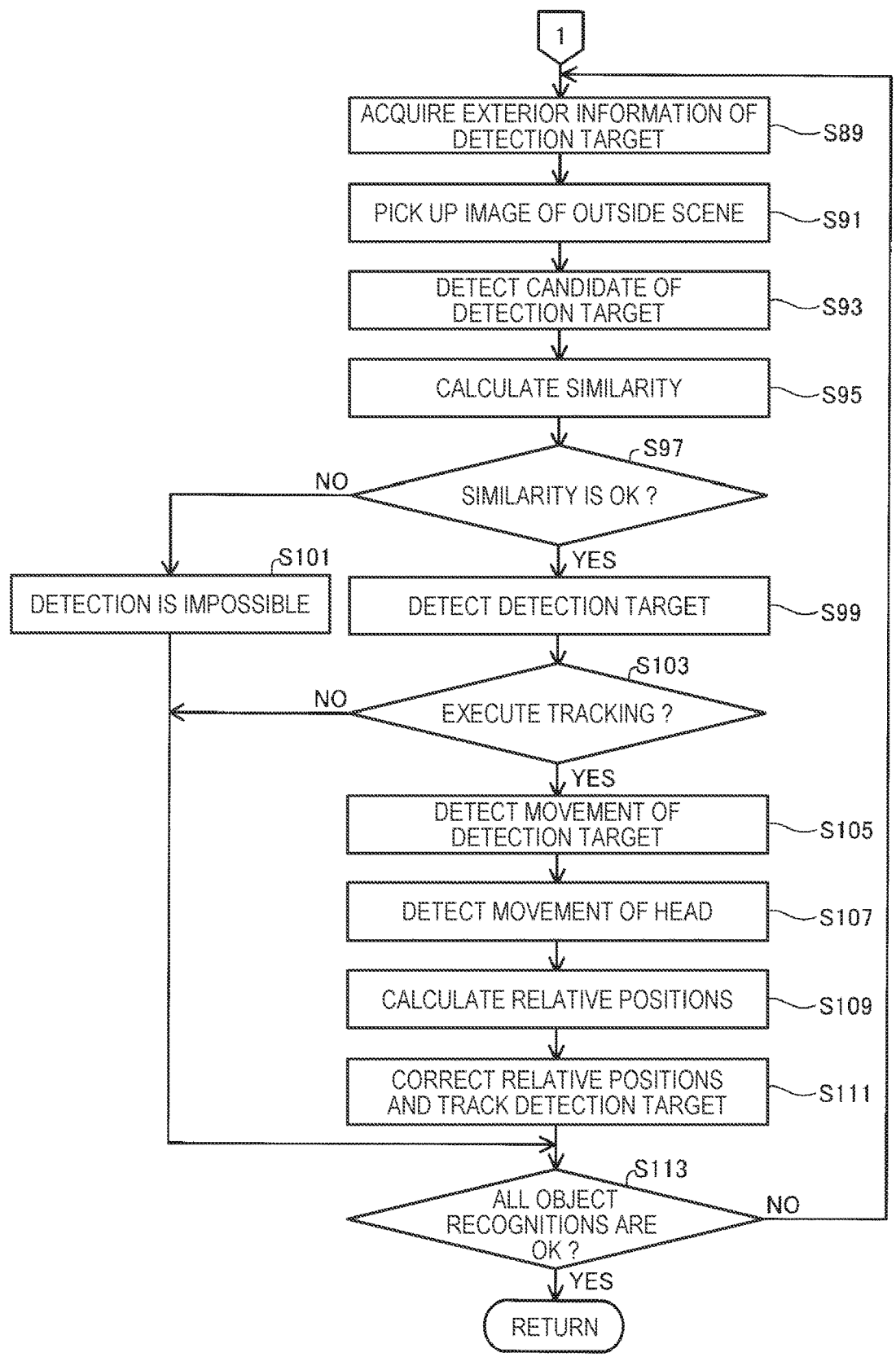
FIG. 14 is a flowchart for explaining the flow of the object recognition processing.

FIGS. 13 and 14 are flowcharts for explaining a flow of the object recognition processing. In the object recognition processing, first, the device setting section 168 determines whether, in an AR scenario to be executed, there is object recognition data detected as a specific target included in a picked-up image of the camera 61a of the HMD 100a executing the AR scenario (step S71). If it is determined that the object recognition data is absent in the AR scenario to be executed (NO in step S71), the CPU 140a ends the object recognition processing.

If it is determined in the processing in step S71 that one or more object recognition data are present in the AR scenario to be executed (YES in step S71), the device setting section 168 acquires object information (e.g., FIG. 4) of the scenario data management table TB2 of the object recognition (step S73). The device setting section 168 specifies a type of the object recognition from the acquired object information (step S75). Examples of the type of the object recognition include a target serving as an image to be detected from the picked-up image and a target of tracking for tracking the target detected out of the picked-up image. Subsequently, the device setting section 168 reads an operation environment of a device for performing the object recognition in the created executing apparatus information table TB3 and an operation environment of a device for performing the object recognition in the device information table TB1 of the information processing apparatus that has created the AR scenario to be executed (step S77).

After performing the processing in step S77, the device setting section 168 determines whether the HMD 100a executing the AR scenario includes a distance sensor that measures a distance from the picked-up image to the detected target (step S79). If it is determined referring to the executing apparatus information table TB3 that the HMD 100a does not include the distance sensor (NO in step S79), the device setting section 168 determines whether to perform the object recognition processing with only the camera 61a (step S80). The device setting section 168 performs the determination of the processing in step S80 on the basis of predetermined operation received by the operation section 135. If it is determined not to perform the object recognition processing with only the camera 61a (NO in step S80), the CPU 140a ends the object recognition processing. If it is determined in the processing in step S80 to perform the object recognition processing with only the camera 61a (YES in step S80), the device setting section 168 executes processing in step S89 in FIG. 14 explained below.

If it is determined in the processing in step S79 in FIG. 13 that the HMD 100a includes distance sensors (YES in step S79), the device setting section 168 determines, as a distance sensor used in the object recognition processing, a distance sensor having the highest accuracy of a measured distance to the target included in the picked-up image among the distance sensors (step S81). Note that, in the processing in step S81, when the HMD 100a includes only one distance sensor, the distance sensor is determined as the distance sensor used in the object recognition processing.

Subsequently, the device setting section 168 determines whether accuracy of the distance sensor determined as being used in the object recognition processing is equal to or higher than accuracy of a distance sensor of an information processing apparatus that has created the AR scenario stored in the device information table TB1 (step S83). If it is determined that the accuracy of the distance sensor used for the object recognition processing is not equal to or higher than the accuracy of the distance sensor stored in the device information table TB1 (NO in step S83), the device setting section 168 causes the image display section 20a to display an image indicating that it is likely that an error occurs in an object recognized when the object recognition processing is performed using the distance sensor (step S85). Subsequently, the operation section 135 receives the predetermined operation, whereby the device setting section 168 determines whether to continue the object recognition processing in a state including the likelihood that there is an error in the object recognition (step S87). If operation for not continuing the object recognition processing is received (NO in step S87), the CPU 140a ends the object recognition processing.

If operation for continuing the object recognition processing is received in the processing in step S87 (YES in step S87), the device setting section 168 acquires, from data of object information (e.g., FIG. 4), exterior information of a detection target for recognizing an object out of the picked-up image (step S89 in FIG. 14). Note that, similarly, if it is determined in the processing in step S83 in FIG. 13 that the accuracy of the distance sensor used in the object recognition processing is equal to or higher than the accuracy of the distance sensor stored in the device information table TB1 (YES in step S83), the device setting section 168 acquires the exterior information of the detection target from the data of the object information (step S89). Examples of the detection target acquired from the data of the object information include a 3D model and a two-dimensional plane image.

When the processing in step S89 is performed, the camera 61a picks up an image of an outside scene (step S91). Subsequently, the device setting section 168 performs pattern matching or a statistical identification method on the picked-up image to detect a candidate of a detection target out of the picked-up image (step S93). The device setting section 168 detects a target same as exterior information of the detection target out of the picked-up image as a candidate of the detection target by reducing accuracy and increasing processing speed. Subsequently, the device setting section 168 compares the detected candidate of the detection target and the exterior information of the detection target to calculate similarity of the detected candidate of the detection target (step S95) and determines on the basis of the calculated similarity whether the candidate of the detection target is treated as the detection target (step S97). The similarity is stored as one kind of information included in control information of the object information. The device setting section 168 may change a threshold for determining the similarity according to the performance such as the resolution of the image pickup section in the device information table TB1 and the executing apparatus information table TB3.

If, in the processing in step S97, the similarity of the candidate of the detection target and the detection target is not equal to or higher than the threshold and the device setting section 168 determines that the candidate of the detection target is not treated as the detection target (YES in step S97), the device setting section 168 performs processing in step S113 explained below. If the similarity of the candidate of the detection target and the detection target is equal to or higher than the threshold in the processing in step S97 (YES in step S97), the device setting section 168 detects the candidate of the detection target as the detection target (step S99). Thereafter, the device setting section 168 determines on the basis of the control information of the object information whether tracking for tracking the detection target detected out of the picked-up image is executed (YES in step S103). If it is determined that the tracking of the detection target is not executed (NO in step S103), the CPU 140a object-recognizes the detected detection target and ends the object recognition processing.

If it is determined in the processing in step S103 that the tracking of the detection target is executed (YES in step S103), the device setting section 168 detects a movement of the detection target detected from the picked-up image (step S105). Thereafter, the direction specifying section 166 detects, on the basis of acceleration and the like of the image display section 20a detected from the ten-axis sensor 66, a movement of the head of the user wearing the image display section 20a (step S107). The device setting section 168 calculates a relation between relative positions of the image display section 20a and the detection target on the basis of the detected movement of the detection target and the detected movement of the head of the user (step S109). Note that, in the second embodiment, an angle of view of the camera 61a of the HMD 100a and a visual field of the user wearing the image display section 20a are set in advance to be the same. After performing the processing in step S109, the device setting section 168 executes, on the basis of the calculated relation between the relative positions, tracking of the position of the detection target with respect to the image display section 20a (step S111).

Thereafter, the device setting section 168 determines whether the processing is performed on all object recognition data included in the AR scenario to be executed (step S113). If it is determined that the processing is not performed on all the object recognition data (NO in step S113), the device setting section 168 performs the processing in step S89 and subsequent steps on the object recognition data on which the processing is not performed. If it is determined in the processing in step S113 that the processing is performed on all the object recognition data (YES in step S113), the CPU 140a ends the object recognition processing.

When the object recognition processing in step S70 in FIG. 10 ends, the device setting section 168 executes UI data output processing for outputting data using a UI corresponding to the HMD 100a that is executing an AR scenario (step S120).

Figure 15:
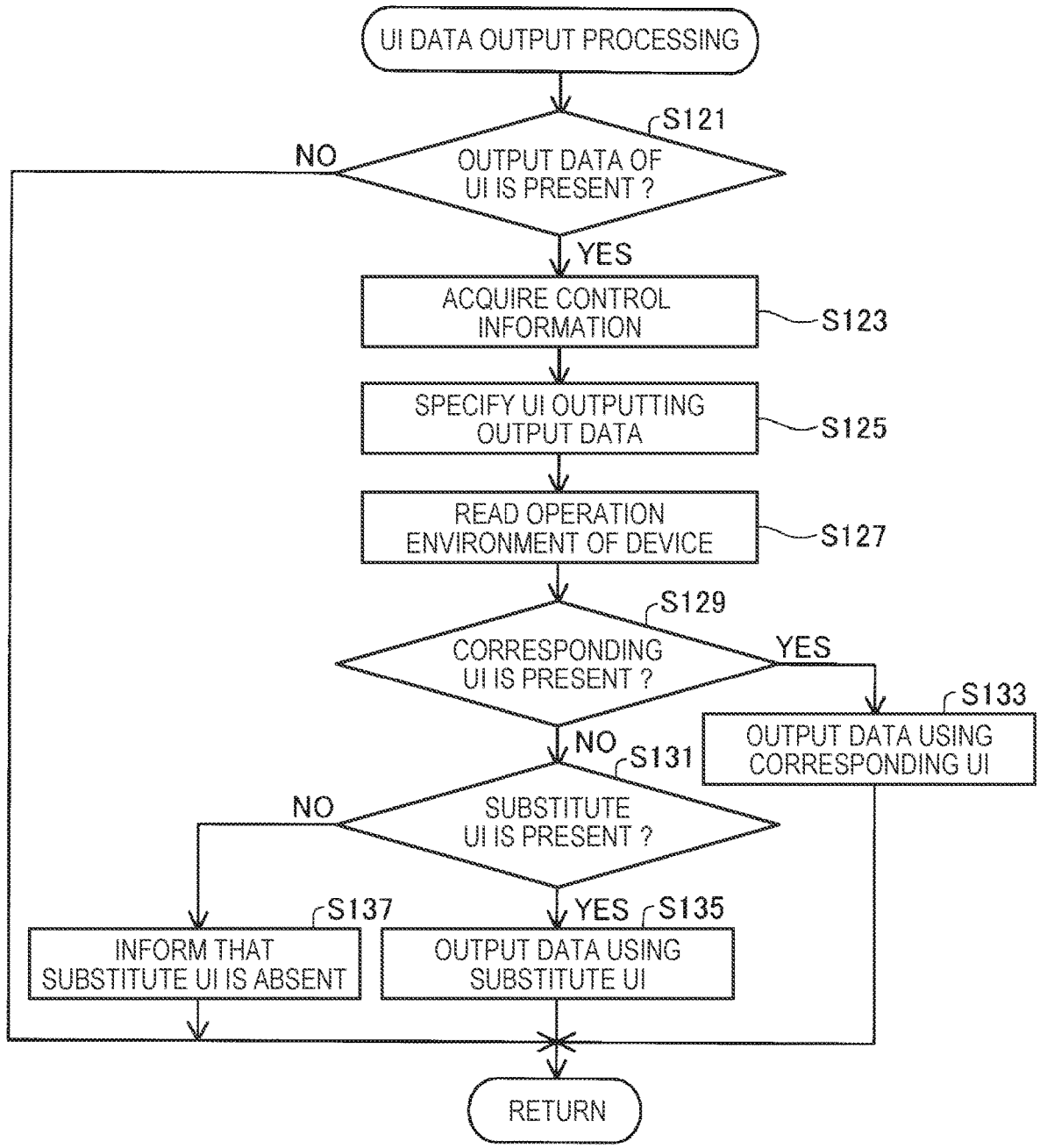
FIG. 15 is a flowchart for explaining a flow of UI data output processing.

FIG. 15 is a flowchart for explaining a flow of the UI data output processing. In the UI data output processing, first, the device setting section 168 determines whether, in an AR scenario to be executed, there is output data output using the UI corresponding to the HMD 100a that executes the AR scenario (step S121). If it is determined that the output data of the UI is absent in the AR scenario to be executed (NO in step S121), the CPU 140a ends the UI data output processing.

If it is determined in the processing in step S121 that output data of the UI is present in the AR scenario to be executed (YES in step S121), the device setting section 168 acquires control information (e.g., FIG. 4) of object information of the output data of the UI (step S123). Subsequently, the device setting section 168 specifies a UI that outputs the output data (step S125). Examples of the UI to be specified include the earphones 32 and 34 that output sound. Subsequently, the device setting section 168 reads an operation environment of the UI for outputting the output data in the executing apparatus information table TB3 and an operation environment of the UI in the device information table TB1 of the information processing apparatus that creates the AR scenario to be executed (step S127). The device setting section 168 determines whether a UI corresponding to the UI of the device information table TB1 for outputting the output data (hereinafter simply referred to as "corresponding UI" as well) is present in the executing apparatus information table TB3 (step S129). If it is determined that the corresponding UI is absent (NO in step S129), the device setting section 168 determines whether a substitute UI, which is a UI capable of outputting the output data, is present (step S131). As the determination whether the substitute UI is present, the device setting section 168 checks whether control information (e.g., "link to a substitute text" or "link to input reception" in FIG. 4) related to the substitute UI is included in the object information of the output data to be output.

If it is determined in the processing in step S131 that the substitute UI is present (YES in step S131), the device setting section 168 outputs the output data using the substitute UI (step S135). The CPU 140a ends the UI data output processing. If it is determined in the processing in step S131 that the substitute UI is absent (NO in step S131), the device setting section 168 notifies the user that the substitute UI for outputting the output data is absent (step S137). The CPU 140a ends the UI data output processing. As a method of the notification, there are a method of displaying, on the image display section 20a, a character image indicating that the output data cannot be output and a method of outputting, via the earphones 32 and 34, sound indicating that the output data cannot be output.

If it is determined in the processing in step S129 that the corresponding UI is present (YES in step S129), the device setting section 168 outputs the output data using the corresponding UI (step S133). The CPU 140a ends the UI data output processing.

After performing the processing in step S120 in FIG. 10, the CPU 140a executes other processing other than the display-related execution processing, the object recognition processing, and the UI data output processing (step S34). The other processing is processing unrelated to the device information table TB1 and the scenario data management table TB2 of the AR scenario to be executed. Examples of the other processing include setting of luminance of the image display section 20a adjusted to an external environment and setting of volume of sound to be output.

In the processing in step S36, the CPU 140a determines whether an end condition among conditions for executing the AR scenario to be executed is satisfied (step S36). The end condition is, for example, acquisition of sound "Yes" explained below or a fifth condition in FIG. 23 explained in a third embodiment. If it is determined that the end condition is satisfied (YES in step S36), the CPU 140a ends the AR scenario execution processing.

If it is determined in the processing in step S36 that the end condition is not satisfied (NO in step S36), the CPU 140a repeats the processing in step S50 and subsequent steps according to the order of the AR scenario to be executed. The processing is repeated, for example, when an AR image is displayed on the image display section 20a in association with a recognized object in a picked-up image after the object recognition processing is performed.

Figure 16:
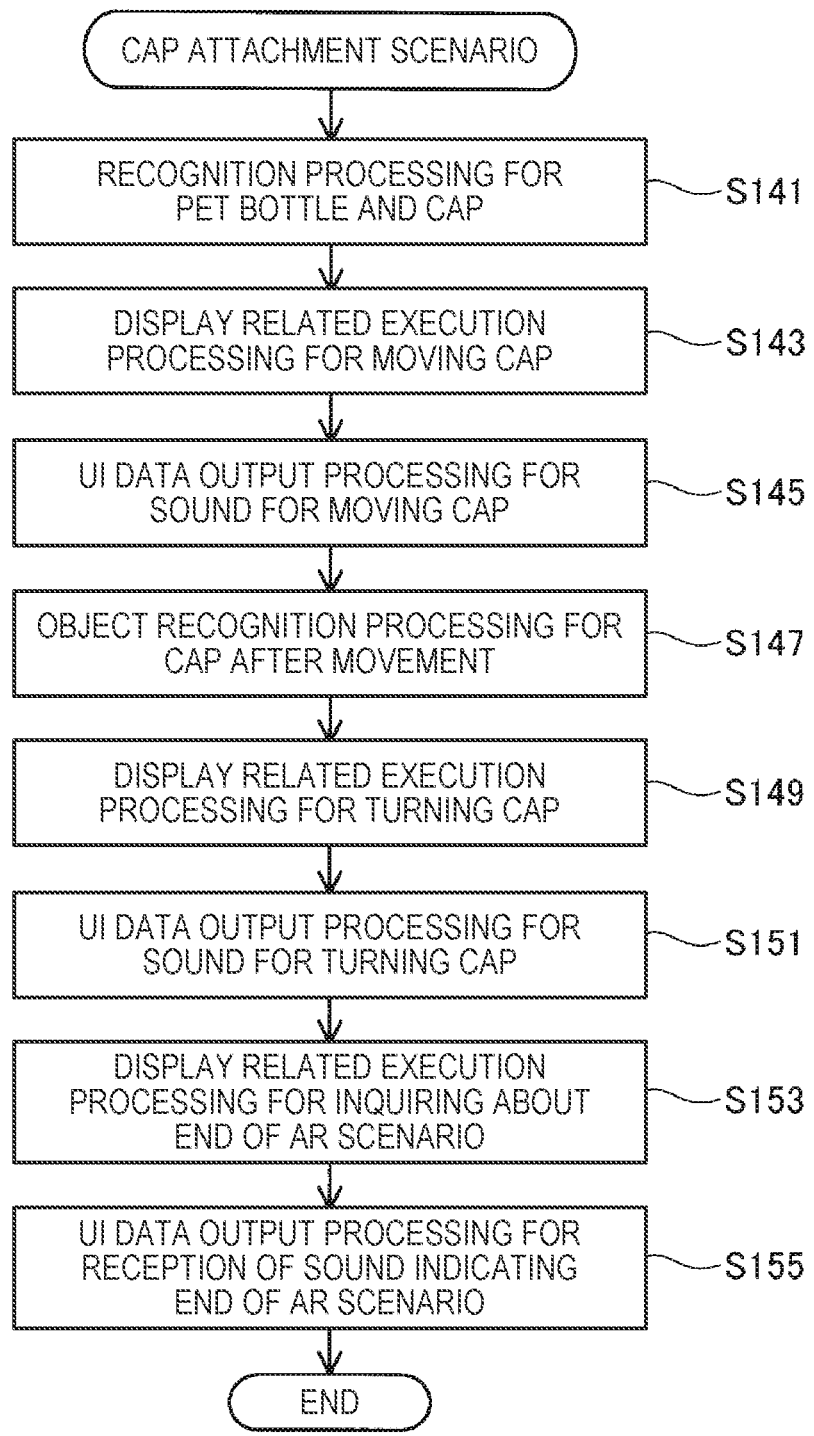
FIG. 16 is a flowchart for explaining a flow of a cap attachment scenario.

In the following explanation, the AR scenario execution processing is explained with reference to an example in which a cap attachment scenario, which is an example of an AR scenario, is executed. FIG. 16 is a flowchart for explaining a flow of the cap attachment scenario. The cap attachment scenario is a work supporting moving image for urging the user to move the cap CP to the opening PTa of the PET bottle PT not attached with the cap CP and attach the cap CP to the opening PTa. In FIG. 16, the processing in step S50 and subsequent steps is shown in the AR scenario execution processing shown in FIG. 10. As shown in FIG. 16, the processing performed according to the order of the AR scenario is not always set to be executed in the order of the display-related execution processing, the object recognition processing, the UI data output processing, and the other processing. Therefore, when there is no processing set to be executed next according to the order of the AR scenario, the processing not set in the AR scenario is skipped until the processing set in the AR scenario is performed.

When the HMD 100a executes the cap attachment scenario, first, the device setting section 168 checks the executing apparatus information table TB3 (step S40 in FIG. 10) and determines whether the HMD 100a is capable of executing the cap attachment scenario (step S32). If it is determined that the HMD 100a is capable of executing the cap attachment scenario (YES in step S32), the CPU 140a performs the object recognition processing for detecting the PET bottle PT and the cap CP out of a picked-up image (step S141 in FIG. 16).

Figure 17:
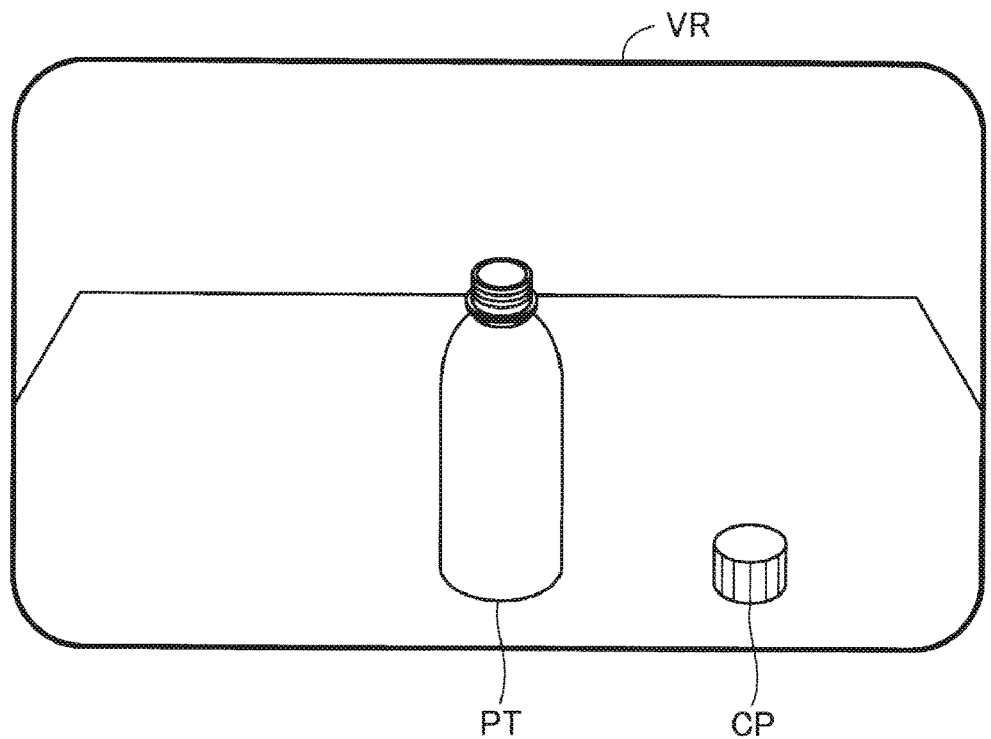
FIG. 17 is an explanatory diagram showing a visual field visually recognized by a user when a PET bottle and a cap are detected out of a picked-up image.

FIG. 17 is an explanatory diagram showing a visual field VR visually recognized by the user when the PET bottle PT and the cap CP are detected out of the picked-up image. In FIG. 17, the visual field VR is shown in which the user visually recognizes the PET bottle PT and the cap CP not attached to the PET bottle PT. After performing the object recognition processing for the PET bottle PT and the cap CP as shown in FIG. 17, subsequently, the CPU 140a performs the display-related execution processing for causing the image display section 20a to display an image for causing the user to move the cap CP (step S143 in FIG. 16).

Figure 18:
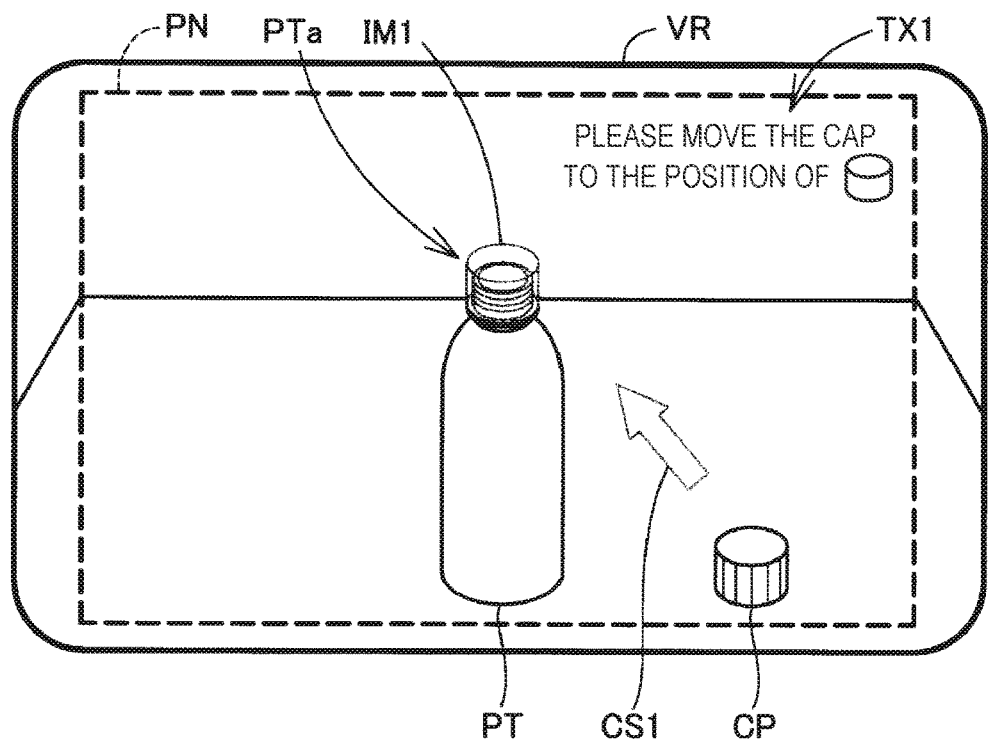
FIG. 18 is an explanatory diagram showing the visual field visually recognized by the user when images associated with the detected PET bottle and the detected cap are displayed on an image display section.

FIG. 18 is an explanatory diagram showing the visual field VR visually recognized by the user when an image associated with the PET bottle PT and the cap CP detected out of the picked-up image is displayed on the image display section 20*a*. In FIG. 18, the visual field VR is shown that is visually recognized by the user when a character image TX1, a cursor image CS1, and a cap image IM1 are displayed in an image display maximum region PN of the image display section 20*a* by the display-related execution processing. Note that the image display maximum region PN indicated by a broken line in FIG. 18 and subsequent figures is a broken line indicating, for convenience, an outer frame of a maximum region where the image display section 20*a* can display an image. The image display maximum region PN is not visually recognized by the user.

The character image TX1 is an image for urging movement of the cap CP to the opening PTa of the PET bottle PT. A position where the character image TX1 is displayed in the image display maximum region PN is decided in advance as the upper right of the image display maximum region PN. The size of a font of characters included in the character image TX1 is decided in advance in a relation with the number of pixels of the image display maximum region PN. The cursor image CS1 is an image for pointing, with an arrow, movement from the object-recognized cap CP to the opening PTa of the PET bottle PT. The device setting section 168 can display the cursor image CS1 in the image display maximum region PN by specifying a feature point of the cap CP and a feature point of the opening PTa in the PET bottle PT. The cap image IM1 is an AR image representing the object-recognized real cap CP after the movement. In the second embodiment, the cap image IM1 is an image representing only the exterior shape of the cap CP. The cap image IM1 is displayed in the image display maximum region PN as a semitransparent image with the luminance thereof adjusted. Therefore, the user can visually recognize the opening PTa of the object-recognized PET bottle PT superimposed on the cap image IM1. The cap image IM1 is displayed in the image display maximum region PN in association with the feature point of the opening PTa in the object-recognized PET bottle PT.

After performing the display-related execution processing (step S143 in FIG. 16), the CPU 140*a* performs the UI data output processing for outputting sound for moving the cap CP (step S145). As the UI data output processing, the CPU 140*a* causes the earphones 32 and 34 to output sound "Please move the cap to the position of the cap image" for urging movement of the object-recognized cap CP to the opening PTa in the PET bottle PT.

Subsequently, the CPU 140*a* performs the object recognition processing of the position of the cap CP after being moved to the opening PTa of the PET bottle PT (step S147). In other words, the CPU 140*a* stands by for detection of movement of the real cap CP to the opening PTa of the PET bottle PT in the picked-up image. After performing object recognition of the cap CP moved to the opening PTa of the PET bottle PT, the CPU 140*a* performs the display-related execution processing for causing the image display section 20*a* to display an image for turning the cap CP with respect to the PET bottle PT (step S149).

Figure 19:
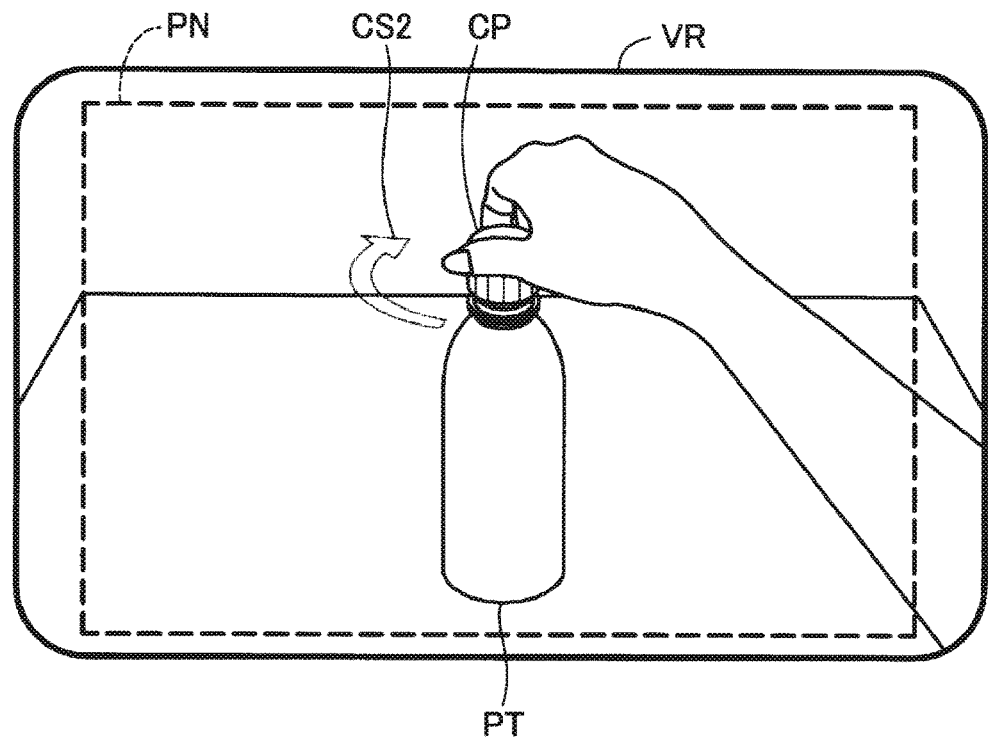
FIG. 19 is an explanatory diagram showing the visual field visually recognized by the user when an image for turning the cap is displayed on the image display section.

FIG. 19 is an explanatory diagram showing the visual field VR visually recognized by the user when the image for turning the cap CP is displayed on the image display section 20*a*. As shown in FIG. 19, after the movement of the cap CP is recognized, a cursor image CS2 is displayed on the image display section 20*a*. The cursor image CS2 is an image of an arrow for urging the user to turn clockwise the cap CP moved to the opening PTa in the PET bottle PT. After performing the display-related execution processing for displaying the cursor image CS2 in the image display maximum region PN (step S149 in FIG. 16), the CPU 140*a* performs the UI data output processing for outputting sound for turning the cap CP with respect to the PET bottle PT (step S151). As the UI data output processing, the CPU 140*a* causes the earphones 32 and 34 to output sound "Please turn the cap in the direction of the arrow" for urging the user to turn clockwise the cap CP along the cursor image CS2.

After performing the UI data output processing (step S151), the CPU 140*a* performs the display-related execution processing for causing the image display section 20*a* to display an image for inquiring the user about an end of the cap attachment scenario serving as the AR scenario (step S153). After the sound "Please turn the cap in the direction of the arrow" serving as the UI data output processing is output, as the display-related execution processing, after a predetermined time (e.g., 3 seconds) elapses, the CPU 140*a* causes the image display section 20*a* to display, in the image display maximum region PN, a character image TX2 for inquiring the user about the end of the cap attachment scenario.

Figure 20:
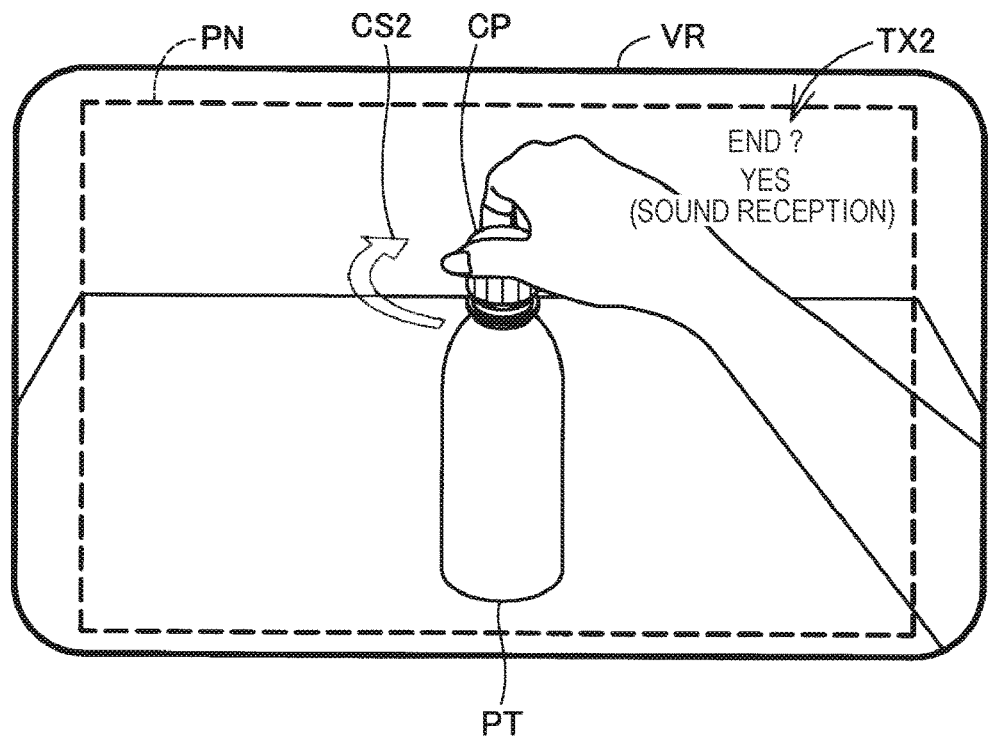
FIG. 20 is an explanatory diagram showing the visual field visually recognized by the user when display-related execution processing for displaying a character image on the image display section is performed.

FIG. 20 is an explanatory diagram showing the visual field VR visually recognized by the user when the display-related execution processing for displaying the character image TX2 on the image display section 20*a* is performed. As the display-related execution processing, the CPU 140*a* causes the image display section 20*a* to display the character image TX2 in a position at the upper right in the image display maximum region PN decided in advance. The character image TX2 is an image representing UI processing in which the microphone 69 receives the end of the cap attachment scenario as outside sound.

Thereafter, the CPU 140*a* performs the UI data output processing for receiving an input of sound indicating the end of the cap attachment scenario serving as the AR scenario (step S155 in FIG. 16). When the microphone 69 acquires sound "Yes" in the UI data output processing, the CPU 140*a* ends the UI data output processing and determines whether all the kinds of processing have been executed (step S36 in FIG. 10). In the cap attachment AR scenario, when the sound "Yes" is acquired, all the kinds of set processing have been executed (YES in step S36). Therefore, the CPU 140*a* ends the cap attachment scenario execution processing serving as the AR scenario. Note that, in the cap attachment scenario, when the microphone 69 does not acquire the sound "Yes" in the UI data output processing, the CPU 140*a* continues to stand by for acquisition of sound.

As explained above, in the HMD 100*a* in the second embodiment, the device setting section 168 creates the executing apparatus information table TB3 representing the performance of the various devices included in the HMD 100*a* executing the AR scenario and acquires the AR scenario including the device information table TB1 and the scenario data management table TB2 stored in the data storing section 120. The device setting section 168 compares the executing apparatus information table TB3 and the device information table TB1. As a result of the comparison, when the HMD 100*a* includes a device having performance different from the performance of the device included in the device information table TB1, the device setting section 168 changes the control information of the object information included in the scenario data management table TB2 associated with the device information table TB1. Therefore, in the HMD 100*a* in the second embodiment, when an AR scenario created by another information processing apparatus is executed, even if the HMD 100*a* does not include a device included in the information processing apparatus that creates the AR scenario, the HMD 100*a* executes the AR scenario according to the device included in the HMD 100*a*. Consequently, the AR scenario does not need to be created according to each HMD 100*a*, which is the image display apparatus executing the AR scenario. The information processing apparatus creating the AR scenario is not limited. Therefore, convenience of use for a person who performs creation and provision of the AR scenario is improved. The AR scenario is executed according to the device of the HMD 100*a*, which is the image display apparatus executing the AR scenario. Therefore, it is possible to improve convenience for the user who executes the AR scenario.

In the HMD 100*a* in the second embodiment, the image setting section 165 causes the image display section 20*a* to display the AR image according to the positions of the real PET bottle PT and the real cap CP detected out of the picked-up image picked up by the camera 61*a*. Therefore, in the HMD 100*a* in the second embodiment, it is possible to cause the user to visually recognize a real target object and a display image further in association with each other. Convenience of use for the user is improved.

C. Third Embodiment

Figure 21:
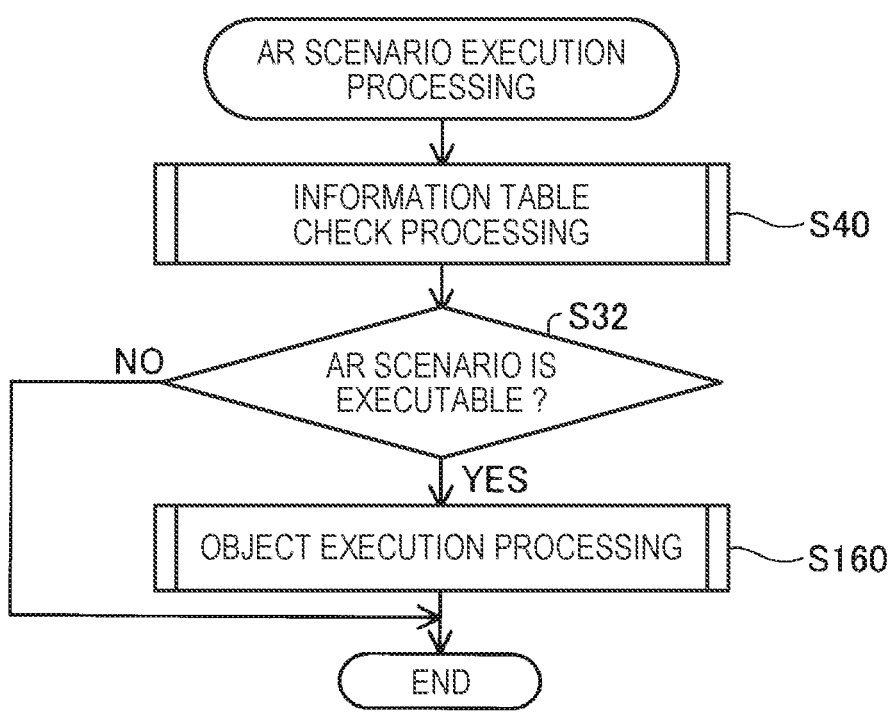
FIG. 21 is a flowchart for explaining a flow of AR scenario execution processing in a third embodiment.

FIG. 21 is a flowchart for explaining a flow of AR scenario execution processing in a third embodiment. The AR scenario execution processing in the third embodiment is different from the AR scenario execution processing in the second embodiment in that the AR scenario execution processing in the third embodiment includes object execution processing S160 instead of the processing in steps S50, S70, S120, S34, and S36 of the AR scenario execution processing in the second embodiment. Therefore, in the third embodiment, explanation is omitted concerning processing same as the processing of the AR scenario execution processing in the second embodiment. In the object execution processing, when a setting condition set in advance is detected, processing of data included in object information associated with the detected setting condition is performed. In the object execution processing, irrespective of a type of the object information such as display relation or object recognition, data processing of display relations and UIs conforming to order of an AR scenario is executed according to a setting condition for setting detected object recognition as a trigger.

Figure 22:
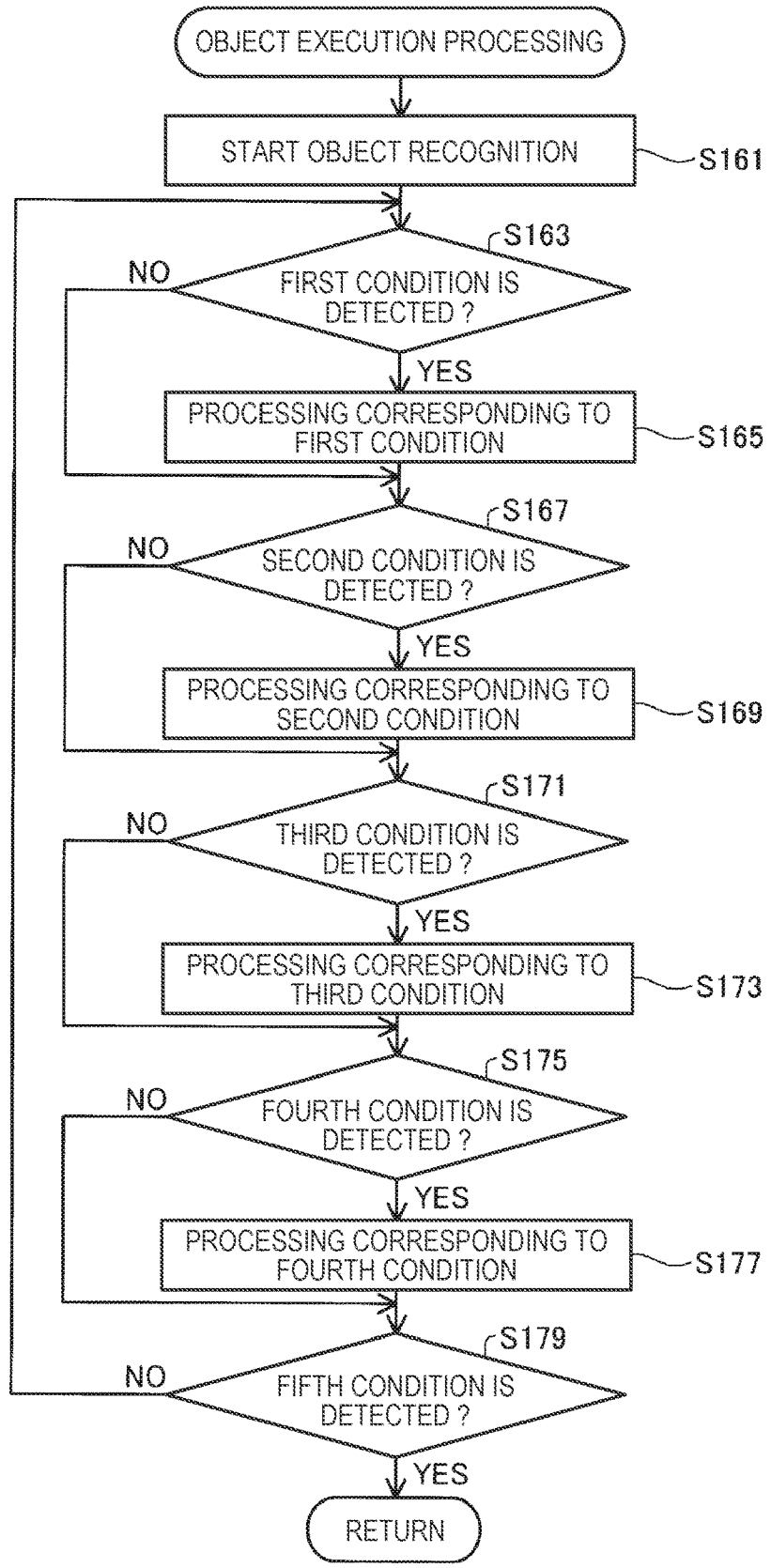
FIG. 22 is a flowchart for explaining a flow of object execution processing.

FIG. 22 is a flowchart for explaining a flow of the object execution processing. FIG. 23 is a list showing contents of respective kinds of processing in the object execution processing in the third embodiment. In FIG. 23, contents (detection content/determination content) of conditions for deciding order of an AR scenario are shown. In the third embodiment, the scenario data management table TB2 includes, as scenario control information, data shown in FIG. 23 and data shown in FIGS. 24, 26, 28, and 30 explained below. In the third embodiment, an example is explained in which two specific targets are recognized as a plurality of specific targets to be object-recognized and, of the two specific targets, at least one of the cap CP serving as one first object and the PET bottle PT serving as the other second object is object-recognized. Note that, in the other embodiments, the number of conditions for deciding order of an AR scenario including setting conditions is not limited. The number of specific targets to be detected may be one or may be three or more.

In the object execution processing, first, the device setting section 168 of the HMD 100*a* starts processing of object recognition for detecting, from an image pickup range, the cap CP serving as the first object and the PET bottle PT serving as the second object (step S161). Subsequently, the device setting section 168 determines whether only the PET bottle PT serving as the second object is detected as a first condition shown in FIG. 23 (step S163 in FIG. 22). If it is determined that the first condition is not detected (NO in step S163), the device setting section 168 performs processing in step S167 explained below. If it is determined in the processing in step S163 that the first condition is detected (YES in step S163), the device setting section 168 performs data processing of display relations and UIs corresponding to the first condition (step S165).

FIG. 24 is a list showing processing contents of display relations and UIs executed in association with the first condition. FIG. 25 is an explanatory diagram showing the visual field VR visually recognized by a user when the first condition is detected. When the first condition is detected, as shown in FIG. 24, as the processing of the display relation, the device setting section 168 causes the image display section 20*a* to display, in the image display maximum region PN, the cap image IM1 shown in FIG. 25 in the opening PTa of the detected real PET bottle PT. Further, the device setting section 168 causes the image display section 20*a* to also display, in the image display maximum region PN, a cursor image CS3 of an arrow pointing the opening PTa of the PET bottle PT in which the cap image IM1 is displayed. As shown in FIG. 24, as the processing of the UI, the device setting section 168 causes the earphones 32 and 34 to output sound "Please move the cap in the direction of the arrow". Further, as shown in FIG. 25, the device setting section 168 causes the image display section 20*a* to display, in the image display maximum region PN, a character image TX3 of "Please move the cap in the direction of the arrow" same as the output sound. Note that, even if the first condition is detected, the device setting section 168 does not perform processing of sound reception in which the microphone 69 detects some sound.

After performing the processing corresponding to the detected first condition (step S165 in FIG. 22), the device setting section 168 determines whether only the cap CP serving as the first object is detected as a second condition shown in FIG. 23 (step S167 in FIG. 22). If it is determined that the second condition is not detected (NO in step S167), the device setting section 168 performs processing in step S171 explained below. If it is determined in the processing in step S167 that the second condition is detected (YES in step S167), the device setting section 168 performs data processing of display relations and UIs corresponding to the second condition (step S169).

FIG. 26 is a list showing processing contents of display relations and UIs executed in association with the second condition. FIG. 27 is an explanatory diagram showing the visual field VR visually recognized by the user when the second condition is detected. When the second condition is detected, as shown in FIGS. 26 and 27, as the processing of the display relation, the device setting section 168 causes the image display section 20*a* to display, in the image display maximum region PN, a bottle image IM2 of the PET bottle PT serving as the second object in a position different from the position of the detected real cap CP. Further, as shown in FIG. 27, the device setting section 168 causes the image display section 20*a* to display, in the image display maximum region PN, the cap image IM1 of the cap CP serving as the first object superimposed on the opening PTa of the bottle image IM2 of the PET bottle PT. In other words, the device setting section 168 causes the image display section 20*a* to display, in the image display maximum region PN, the cap image IM1 and the bottle image IM2 representing a positional relation in a final state between the cap CP and the PET bottle PT at the time when the AR scenario is executed to the last according to the order. Further, the device setting section 168 causes the image display section 20*a* to also display, in the image display maximum region PN, the cursor image CS3 of the arrow pointing the opening PTa of the PET bottle PT in which the cap image IM1 is displayed. As the processing of the UI, the device setting section 168 causes the earphones 32 and 34 to output sound "Please move the cap in the direction of the arrow" same as the sound output when the first condition is detected. Further, as shown in FIG. 27, the device setting section 168 causes the image display section 20*a* to display the character image TX3 in the image display maximum region PN.

After performing the processing corresponding to the detected second condition (step S169 in FIG. 22), the device setting section 168 determines whether the cap CP serving as the first object and the PET bottle PT serving as the second object apart from each other are detected as a third condition shown in FIG. 23 (step S171 in FIG. 22). If it is determined that the third condition is not detected (NO in step S171), the device setting section 168 performs processing in step S175 explained below. If it is determined in the processing in step S171 that the third condition is detected (YES in step S171), the device setting section 168 performs data processing of display relations and UIs corresponding to the third condition (step S173).

Figure 29:
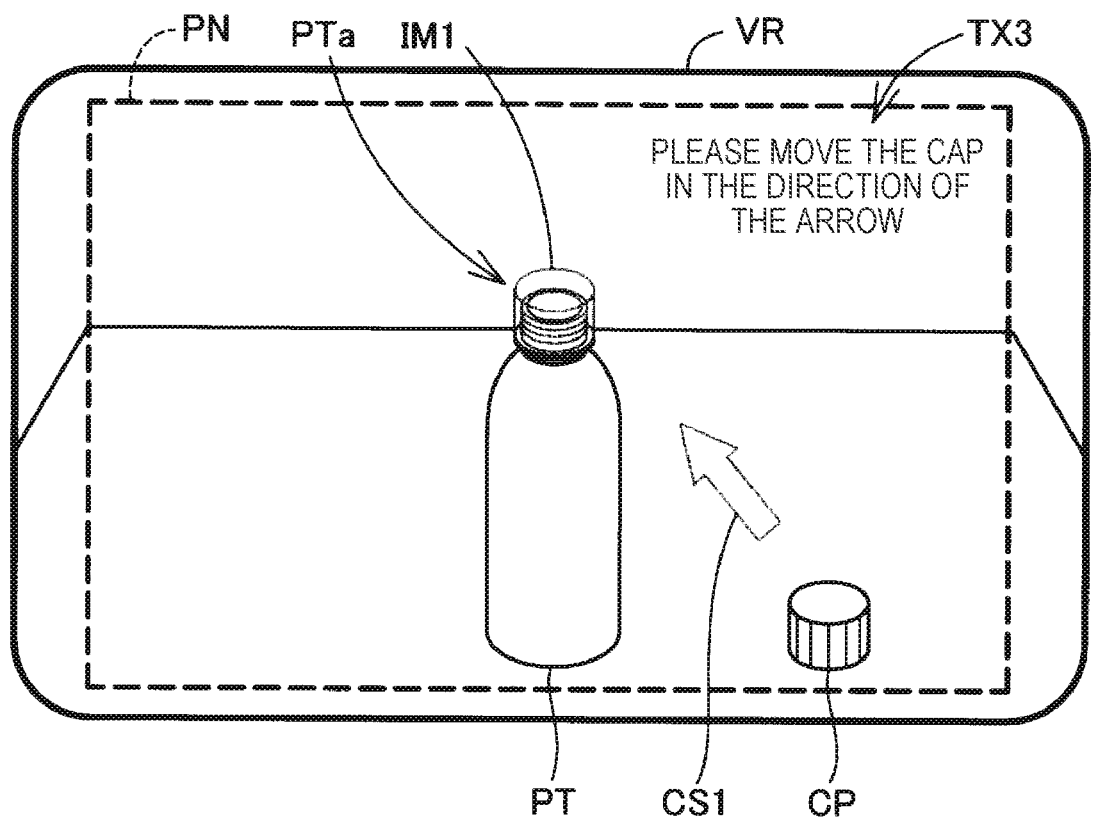
FIG. 29 is an explanatory diagram showing the visual field visually recognized by the user when the third condition is detected.

FIG. 28 is a list showing processing contents of display relations and UIs executed in association with the third condition. FIG. 29 is an explanatory diagram showing the visual field VR visually recognized by the user when the third condition is detected. When the third condition is detected, as shown in FIGS. 28 and 29, as the processing of the display relation, the device setting section 168 causes the image display section 20*a* to display, in the image display maximum region PN, the cap image IM1 of the cap CP serving as the first object to be superimposed on the opening PTa of the detected real PET bottle PT serving as the second object. Further, the device setting section 168 causes the image display section 20*a* to display, in the image display maximum region PN, the cursor image CS1 pointing movement from the detected real cap CP to the opening PTa of the PET bottle PT. As the processing of the UI, the device setting section 168 causes the earphones 32 and 34 to output sound "Please move the cap in the direction of the arrow" same as the sound output when the first condition is detected. Further, as shown in FIG. 29, the device setting section 168 causes the image display section 20*a* to display the character image TX3 in the image display maximum region PN.

After performing the processing corresponding to the detected third condition (step S173 in FIG. 22), the device setting section 168 determines whether a state in which the cap CP serving as the first object is attached to the opening PTa of the PET bottle PT serving as the second object is detected as a fourth condition shown in FIG. 23 (step S175). If it is determined that the fourth condition is not detected (NO in step S175), the device setting section 168 performs processing in step S179 explained below. If it is determined in the processing in step S175 that the fourth condition is detected (YES in step S175), the device setting section 168 performs data processing of display relations and UIs corresponding to the fourth condition.

Figure 31:
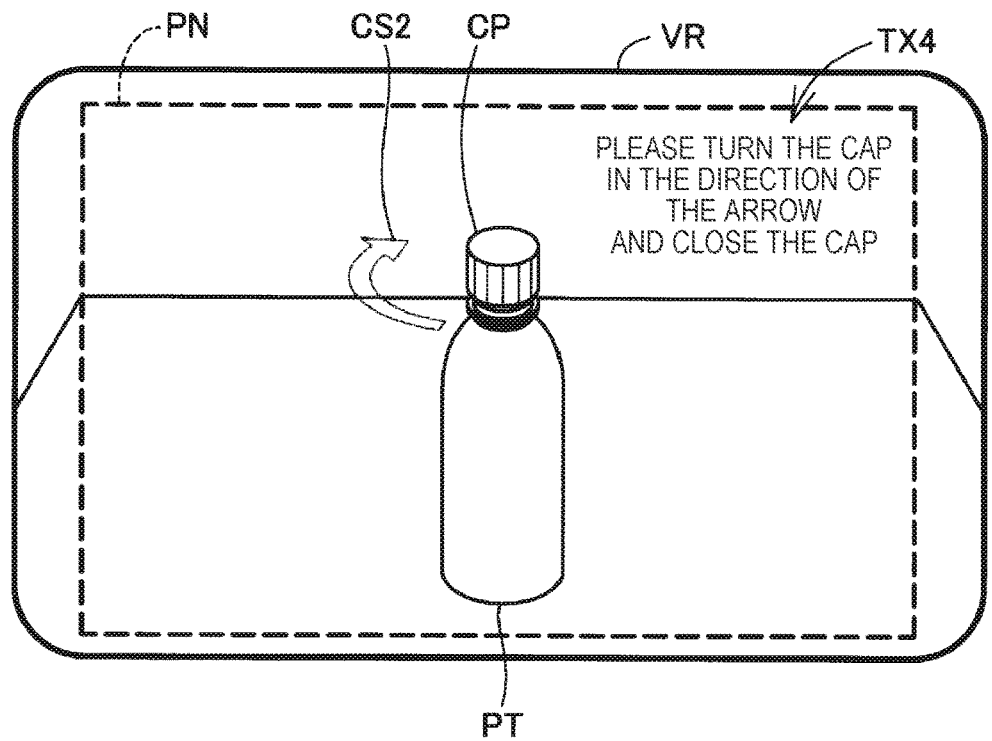
FIG. 31 is an explanatory diagram showing the visual field visually recognized by the user when the fourth condition is detected.
Figure 32:
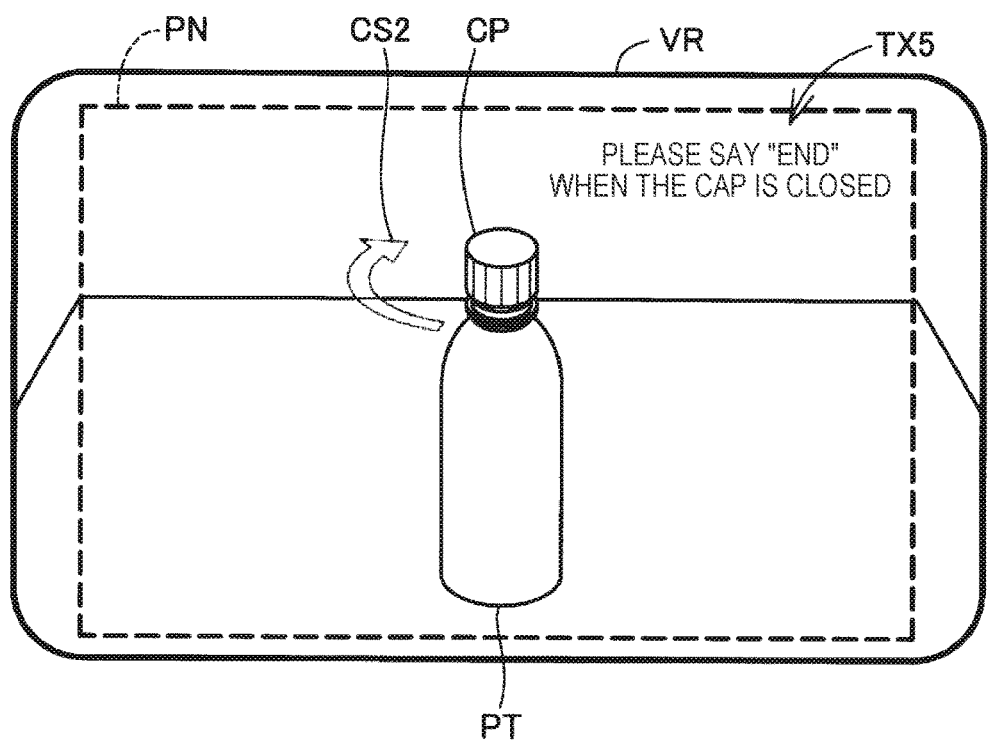
FIG. 32 is an explanatory diagram showing the visual field visually recognized by the user when a character image is displayed after the fourth condition is detected.

FIG. 30 is a list showing processing contents of display relations and UIs executed in association with the fourth condition. FIG. 31 is an explanatory diagram showing the visual field VR visually recognized by the user when the fourth condition is detected. When the fourth condition is detected, as shown in FIGS. 30 and 31, as the processing of the display relation, the device setting section 168 causes the image display section 20*a* to display, in the image display maximum region PN, the cursor image CS2 of an arrow for urging clockwise turning of the detected real cap CP when the cap CP is viewed from above the PET bottle PT. As the processing of the UI, the device setting section 168 causes the earphones 32 and 34 to output sound "Please turn the cap in the direction of the arrow and close the cap". Further, as shown in FIG. 31, the device setting section 168 causes the image display section 20*a* to display, in the image display maximum region PN, a character image TX4 representing contents same as content of the output sound. Thereafter, further, the device setting section 168 causes the earphones 32 and 34 to output sound "Please say "end" when the cap is closed". Further, the device setting section 168 causes the image display section 20*a* to display, in the image display maximum region PN, a character image TX5 representing content same as the output sound "Please say "end" when the cap is closed". FIG. 32 is an explanatory diagram showing the visual field VR visually recognized by the user when the character image TX5 is displayed after the fourth condition is detected.

After performing the processing corresponding to the detected fourth condition (step S177 in FIG. 22), the device setting section 168 determines whether the microphone 69 detects sound "end" (FIGS. 30 and 32) serving as predetermined sound is detected as the fifth condition shown in FIG. 23 after the processing corresponding to the fourth condition is performed (step S179 in FIG. 22). If it is determined that the fifth condition is not detected (NO in step S179), the device setting section 168 repeats the processing in step S163 and subsequent steps. If it is determined in the processing in step S179 that the fifth condition is detected (YES in step S179), the device setting section 168 ends the object execution processing. Note that the first condition and the like correspond to the predetermined condition in the appended claims. The display of the cap image IM1 and the detection of the sound set in advance correspond to the presentation or the reception of the predetermined information in the appended claims.

As explained above, in the HMD 100*a* in the third embodiment, the AR scenario stored in the data storing section 120 includes the information concerning the conditions for executing the object processing such as the first condition. In this way, in the AR scenario execution processing, the processing of the display relations and the UIs is performed on condition that the object information of the object recognition and the tracking is detected. Note that a relation between the processing to be executed and the setting conditions of the object recognition and the like associated with the processing to be executed can be variously modified.

D. Fourth Embodiment

Figure 33:
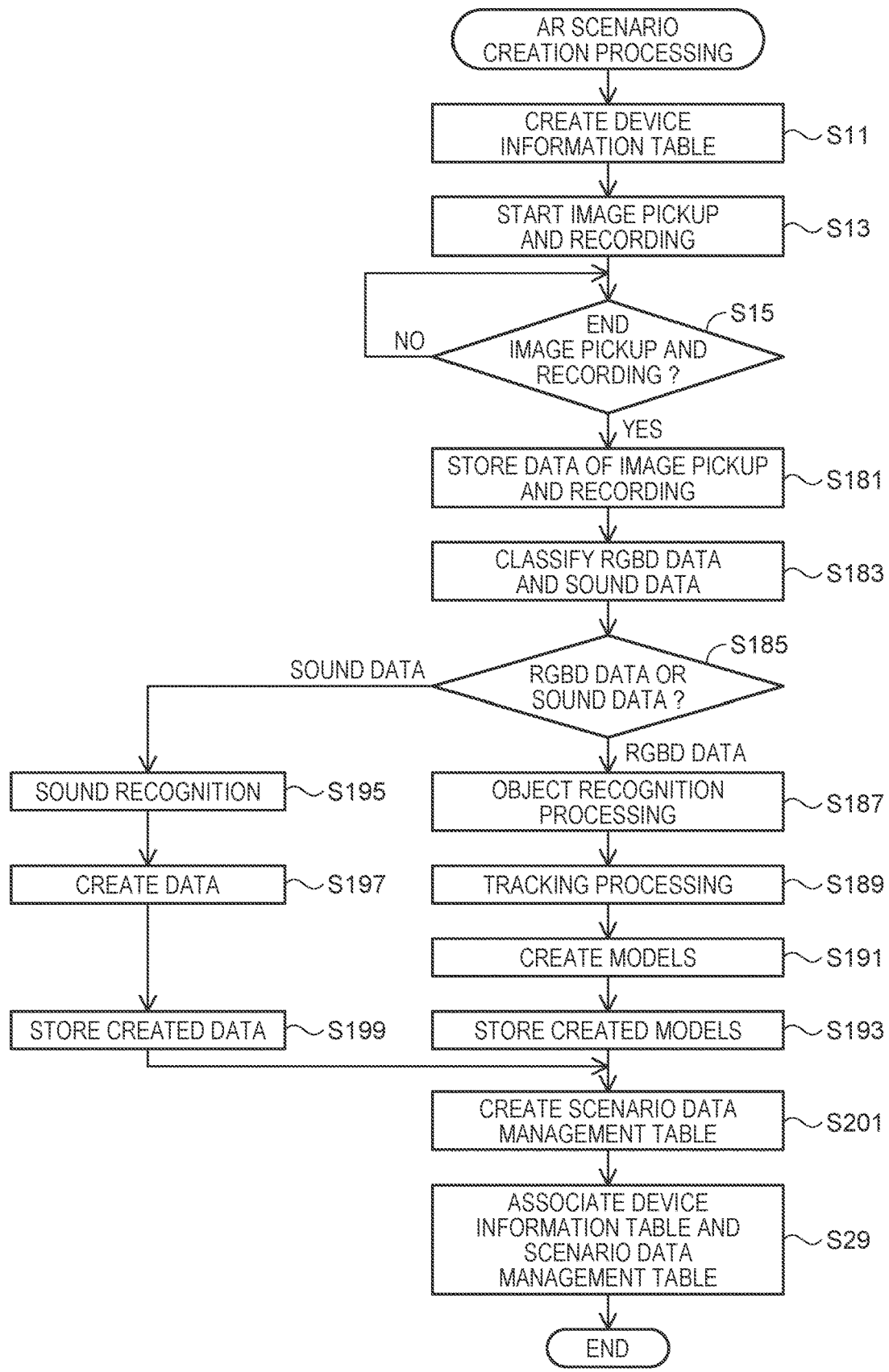
FIG. 33 is a flowchart for explaining a flow of AR scenario creation processing in a fourth embodiment.

FIG. 33 is a flowchart for explaining a flow of AR scenario creation processing in a fourth embodiment. The AR scenario creation processing in the fourth embodiment is different from the AR scenario creation processing in the first embodiment shown in FIG. 5 in that the scenario data management table TB2 is created by distinguishing RGBD data including color information and distance information and sound data acquired by the microphone 69. Specifically, the AR scenario creation processing in the third embodiment includes processing from step S181 to step S201 shown in FIG. 33 instead of the processing in step S17 to step S27 in the AR scenario creation processing shown in FIG. 5. Therefore, in the fourth embodiment, explanation is omitted concerning processing same as the processing of the AR scenario creation processing in the first embodiment.

In the AR scenario creation processing in the fourth embodiment, if the operation section 135 of the HMD 100 receives predetermined operation for ending image pickup and recording and the AR-scenario control section 141 ends the image pickup and the recording (YES in step S15), the AR-scenario control section 141 stores data acquired by the image pickup and the recording. Consequently, even if an apparatus performing the image pickup and the recording cannot perform creation of an AR scenario, the HMD 100 can create an AR scenario by acquiring the data of the image pickup and the recording. Note that, in the other embodiments, the processing in step S181 does not have to be performed.

The AR-scenario control section 141 classifies the data acquired by the image pickup and the recording into RGBD data and sound data (step S183). The AR-scenario control section 141 determines whether each of the classified data is the RGBD data or the sound data (step S185). In the data determined as the RGBD data (RGBD data in step S185), the AR-scenario control section 141 recognizes, as individual objects, objects included in an image pickup range using the object recognizing section 143 and extracts, from the recognized objects, for example, parts of a human body through pattern matching or the like (step S187).

The AR-scenario control section 141 specifies whether each of the recognized objects is a moving object and a stationary object and performs tracking processing for tracking the moving object using the object racking section 142 (step S189). The AR-scenario control section 141 creates, with the 3D-model generating section 144, for the respective specified moving object and stationary object, a 3D model and a 2D model using RGB data acquired by the sensor control section 145 and distance data acquired by the distance sensor 65 (step S191).

The AR-scenario control section 141 causes the data storing section 120 to store the respective created models as separate data (step S193). At this point in time, for example, the model of the cap CP and the model of the PET bottle PT in the first embodiment are stored in the data storing section 120 in a state in which the models have no relation. Thereafter, the AR-scenario control section 141 performs processing of step S201 explained below.

The AR-scenario control section 141 performs, with the UI control section 146, sound recognition on the data determined as the sound data in the processing in step S185 (sound data in step S185) (step S195). When the AR scenario is executed on the sound-recognized data, the AR-scenario control section 141 creates, with the UI control section 146, sound data to be output and creates, with the text converting section 152, a character image that the AR-scenario control section 141 causes the image display section 20a to display in the image display maximum region PN (step S197).

The AR-scenario control section 141 causes the data storing section 120 to store the created respective sound data and character image as separate data (step S199). At this point in time, for example, contents of the character image TX1 in the first embodiment and the character image TX1 output as sound are stored in the data storing section 120 in a state in which the contents have no relation.

Thereafter, the AR-scenario control section 141 creates the scenario data management table TB2 using the data of the models created by the processing in step S191 and the data of sound and the like created by the processing in step S197 (step S201). The AR-scenario control section 141 creates the scenario data management table TB2 including a condition for executing the AR scenario and presentation and reception of information executed when the condition is satisfied. The separately created models, sound data, and the like are associated by the processing.

The AR-scenario control section 141 stores, in the data storing section 120, an AR scenario associating the created scenario data management table TB2 and the device information table TB1 created by the processing in step S11 (step S29). In this way, the scenario data management table TB2 created by the processing of the data acquired by the image pickup and the recording and a creation method for an AR scenario can be variously modified.

E. Modifications

Not that the invention is not limited to the embodiments and can be implemented in various forms without departing from the spirit of the invention. For example, modifications explained below are also possible.

E-1. Modification 1

In the first embodiment, the HMD 100 is explained as the example of the information processing apparatus that creates an AR scenario. However, the information processing apparatus can be variously modified. For example, the information processing apparatus that creates an AR scenario may be, for example, a PC including a camera functioning as an image pickup section. The information processing apparatus may be an information system including a plurality of cameras functioning as image pickup sections and a plurality of distance sensors.

In the first embodiment, the HMD 100 functioning as the information processing apparatus creates an AR scenario. However, the information processing apparatus does not always need to create an AR scenario. For example, the information processing apparatus only has to be a device that stores the device information table TB1 and the scenario data management table TB2 in a storing section such as a hard disk in association with each other. The information processing apparatus may be a server or the like.

In the first embodiment, the AR-scenario control section 141 creates the device information table TB1 of the HMD 100 functioning as the information processing apparatus that creates the AR scenario. However, the device information table TB1 to be created can be variously modified. The AR-scenario control section 141 may create, as the device information table TB1, performance of devices not used in creating the AR scenario. Since the performance of the devices not used in creating the AR scenarios is created as the device information table TB1, it is possible to quickly perform the selection of the substitute UI in the AR scenario execution processing (step S131 in FIG. 15).

The information included in the device information table TB1 does not always represent the performance of a device that creates an AR scenario (referred to as "creating device performance" as well). The information may be the performance of an optimum HMD for executing the AR scenario, types of devices included in the HMD, and the performance of the devices included in the HMD (referred to as "executing device performance"). The creating device performance and the executing device performance are collectively described as specifications of hardware required for an HMD (an example of the information processing apparatus) to execute the AR scenario.

Simple examples of roles of the device information table TB1 are as described in (1) and (2) below.

(1) The device information table TB1 includes information indicating "a camera and a distance sensor" in association with certain object information classified into the object recognition. Consequently, it is possible to inform an HMD executing the scenario information that it is desirable to execute the object recognition processing concerning the object by combining the camera and the distance sensor. An HMD including only the camera can be prevented from executing the scenario information according to comparison of the device information table TB1 and the executing apparatus information table TB3 of the HMD or can perform the object recognition on the object with only the camera when the user accepts that an error occurs.

(2) The device information table TB1 includes information indicating "camera" in association with certain object information classified into the object recognition. Consequently, it is possible to inform an HMD executing the scenario information that it is sufficient to use the camera to execute the object recognition processing on the object or it is more desirable to use the camera and the distance sensor in combination.

In FIG. 4 in the first embodiment, an example of the object information included in the scenario data management table TB2 is explained. However, the object information and the scenario data management table TB2 can be variously modified. In the embodiments, the object information is segmented into the display relation, the object recognition, and the UI. However, the object information does not need to be segmented or may be segmented into segmentations more than the three segmentations. For example, the object information may be treated as object information of time-series processing according to order of an AR scenario like first processing and second processing without being segmented into the display relation and the object recognition. In the object information, as shown in FIG. 4, the control information and the data are divided and associated with each other. However, a data structure of the object information can be variously modified. For example, as the data structure of the object information, the control information and the data may not be divided or may be divided according to separate categories parallel to the control information and the data.

In the object information in the first embodiment, as shown in FIG. 4, the position information included in the control information is the information based on the coordinate of the feature point. However, a form of the position information can be variously modified. For example, the position information may be the center of gravity of the 3D model serving as the data. The feature point may be set by a portion subjected to image pickup in an object detected by the object recognition. The position information may be optionally determined by operation of the operation section 135.

In the AR scenario creation processing in the first embodiment, the AR-scenario control section 141 performs the image pickup of the outside scene and the acquisition of the outside sound in order to create an AR scenario (step S13 in FIG. 5). However, it is unnecessary to acquire the outside sound. In order to create an AR scenario, as operation different from the image pickup of the outside scene and the acquisition of the outside sound, the AR-scenario control section 141 may acquire, for example, as a character image, characters input to the keyboard of the operation section 135. The AR-scenario control section 141 may combine a created plurality of AR scenarios to create one AR scenario.

When an AR scenario is being executed, the AR scenario may be set to branch according to a detected detection target.

In the first embodiment, the AR-scenario control section 141 creates the device information table TB1 representing the performance of the various devices of the HMD 100 functioning as the information processing apparatus that creates the AR scenario. However, the AR-scenario control section 141 may create information replacing the device information table TB1. For example, the AR-scenario control section 141 may create standardized correspondence information not depending on the performance of the various devices instead of the device information table TB1 or in addition to the device information table TB1. The AR-scenario control section 141 may create a conversion coefficient for the standardized correspondence information and the device information table TB1 instead of the standardized correspondence information. In this modification, for example, when the real PET bottle PT is object-recognized and the cap image IM1 of the cap CP is displayed according to the object-recognized PET bottle PT, if a distance to the PET bottle PT is known, the cap image IM1 adjusted to the size of the PET bottle PT is displayed. Specifically, the cap image IM1 having a balanced size relation with respect to the size of the PET bottle PT is displayed.

E-2. Modification 2

In the second embodiment, the HMD 100a is explained as the example of the image display apparatus that executes an AR scenario. However, the image display apparatus can be variously modified. For example, the image display apparatus executing an AR scenario may be a smart phone or a PC capable of displaying an image. The image display apparatus may be an information system including an image display section capable of displaying an image. The HMD 100a functioning as the image display apparatus may not include the data storing section 120 having an AR scenario stored therein. The HMD 100a may execute an AR scenario acquired from a server or the like by, for example, radio communication.

In the second embodiment, the HMD 100a executing an AR scenario includes the ten-axis sensor 66 that detects a movement of the head of the user wearing the image display section 20a. However, the HMD 100a does not always have to include the ten-axis sensor 66. The HMD 100a may include, instead of the ten-axis sensor 66, a gyro sensor or the like that detects angular velocity.

In the information table check processing shown in FIG. 11 in the second embodiment, the device setting section 168 receives, with the operation section 135, the inputs of the devices and the OS of the HMD 100a that executes an AR scenario (step S43). However, a method of checking the performance of the devices of the image display apparatus executing an AR scenario can be variously modified. For example, when determining that the HMD 100a executes an AR scenario, the device setting section 168 may automatically create the executing apparatus information table TB3 of the HMD 100a.

In the object recognition processing shown in FIG. 13 in the second embodiment, the processing changes according to the accuracy of the distance sensor 65 included in the HMD 100a that executes an AR scenario (step S83 to step S87). However, the processing performed according to the accuracy of the distance sensor 65 can be variously modified. For example, the device setting section 168 may continue the object recognition processing without informing occurrence of an error irrespective of the accuracy of the distance sensor 65. In the object recognition processing, a predetermined threshold may be set in advance concerning an occurring error. Presence or absence of execution of an AR scenario may be determined according to a relation between the error and the threshold.

In the AR scenario execution processing shown in FIG. 10 in the second embodiment, an end halfway in the execution of the AC scenario is not described. However, the CPU 140a may forcibly end the AR scenario being executed halfway by receiving predetermined operation.

In the embodiments, the examples of the cameras 61 and 61a that pick up an image of an outside scene and the distance sensor 65 that measures a distance to an specific target subjected to the image pickup are explained. However, the cameras and the sensor can be variously modified. For example, when a stereo camera is used as the image pickup section, a distance to a specific target subjected to image pickup by the stereo camera is measured. The stereo camera has a characteristic that the stereo camera is inexpensive and excellent in measurement in a bright place. As a method of measuring the distance to the specific target subjected to the image pickup, a structured light method may be used. The structure light method is a method of restoring a three-dimensional shape of an object by radiating a light pattern of a special design on the surface of the object and analyzing deformation of the radiated pattern to thereby estimate depth (that is, the distance between a point on the surface of the object and a camera). The structured light method has a characteristic that the structured light method has high measurement accuracy and is excellent in near distance measurement. As the method of measuring the distance to the specific target subjected to the image pickup, TOF (Time Of Flight) may be used. In the TOF, a load of processing for measuring the distance to the specific target is small. The TOF is suitable for measurement for tracking a moving object. The TOF has a characteristic that a decrease in sensitivity involved in the magnitude of a distance is small.

E-3. Modification 3

In the embodiments, the operation section 135 is formed in the control section 10. However, a form of the operation section 135 can be variously modified. For example, a user interface functioning as the operation section 135 may be provided separately from the control section 10. In this case, the operation section 135 is separate from the control section 10 in which the power supply 130 and the like are formed. Therefore, the operation section 135 can be reduced in size. Operability for the user is improved. The ten-axis sensor 66 that detects a movement of the operation section 135 is formed in the operation section 135. Various kinds of operation are performed on the basis of the detected movement. Therefore, the user can intuitively operate the HMD 100.

For example, the image-light generating section may include an organic EL (Organic Electro-Luminescence) display and an organic EL control section. For example, as the image generating section, a LCOS (Liquid crystal on silicon; LCoS is a registered trademark), a digital micro-mirror device, and the like can be used instead of the LCD. For example, the invention can also be applied to a head mounted display of a laser retinal projection type. In the case of the laser retinal projection type, the image display maximum region PN can be defined as an image region recognized by the eyes of the user. The image display maximum region PN may be configured by a display of a MEMS shutter system that opens and closes MEMS shutters formed in pixels.

For example, the HMD 100 may be a head mounted display of a form in which the optical-image display sections cover only a part of the eyes of the user, in other words, a form in which the optical-image display sections do not completely cover the eyes of the user. The HMD 100 may be a head mounted display of a so-called monocular type. Instead of the HMD 100, a hand-held display fixed in a position by the user with the hands like a binocular rather than being mounted on the head of the user may be used as the image display apparatus. In the embodiments, the HMD 100 is a binocular optical transmission type. However, the invention can also be applied to head-mounted display devices of other types such as a video transmission type.

The HMD 100 may be used as a display device for only displaying an image based on an image signal received from another device. Specifically, the HMD 100 may be used as a display device equivalent to a monitor of a desktop PC. For example, the HMD 100 receives an image signal from the desktop PC, whereby an image may be displayed in the image display maximum region PN of the image display section 20.

The HMD 100 may be used to function as a part of a system. For example, the HMD 100 may be used as a device for executing a function of a part of a system including an airplane. A system in which the HMD 100 is used is not limited to the system including the airplane and may be systems including an automobile, a bicycle, and the like.

Figure 34A:
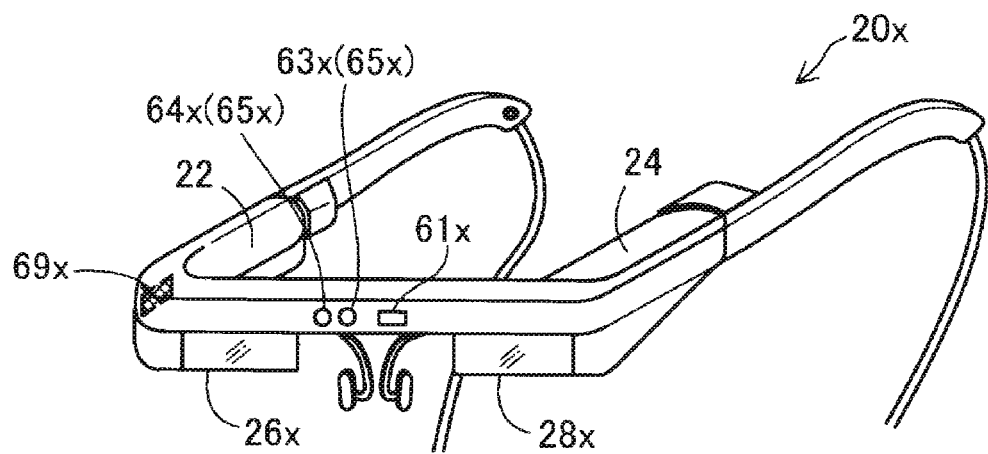
FIGS. 34A and 34B are explanatory diagrams showing the exterior configurations of HMDs in a modification.
Figure 34B:
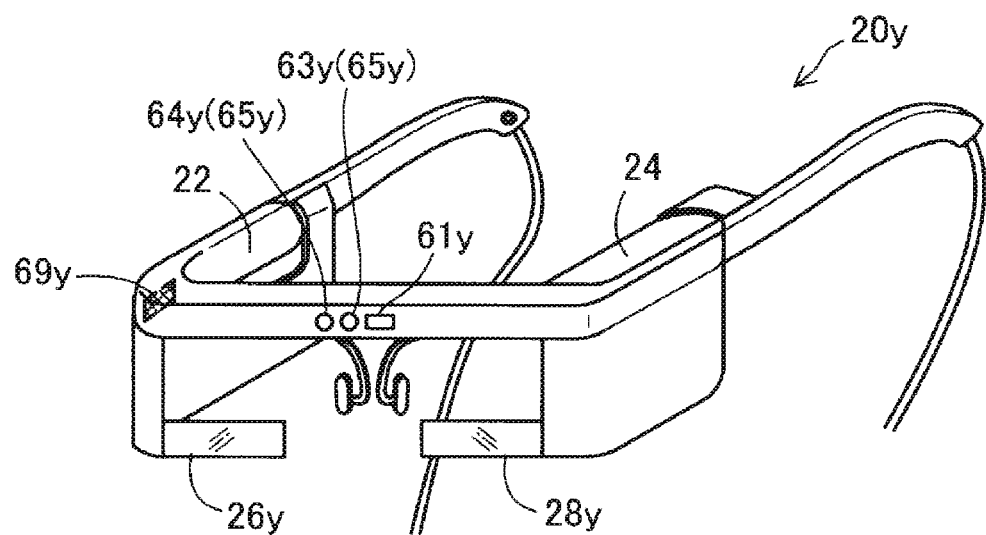

FIGS. 34A and 34B are explanatory diagrams showing the exterior configurations of HMDs in a modification. In the case of an example shown in FIG. 34A, the HMD is different from the HMD 100 shown in FIG. 1 in that an image display section 20x includes a right optical-image display section 26x instead of the right optical-image display section 26 and includes a left optical-image display section 28x instead of the left optical-image display section 28. The right optical-image display section 26x is formed smaller than the optical member in the embodiments and disposed obliquely above the right eye of the user during wearing of an HMD 100x. Similarly, the left optical-image display section 28x is formed smaller than the optical member in the embodiments and disposed obliquely above the left eye of the user during wearing of the HMD 100x. In the case of an example shown in FIG. 34B, the HMD is different from the HMD 100 shown in FIG. 1 in that an image display section 20y includes a right optical-image display section 26y instead of the right optical-image display section 26 and includes a left optical-image display section 28y instead of the left optical-image display section 28. The right optical-image display section 26y is formed smaller than the optical member in the embodiments and disposed obliquely below the right eye of the user during wearing of an HMD. The left optical-image display section 28y is formed smaller than the optical member in the embodiments and disposed obliquely below the left eye of the user during wearing of the HMD. In this way, the optical-image display sections only have to be disposed in the vicinity of the eyes of the user. The size of the optical members forming the optical-image display sections may be any size. The HMD can be implemented as an HMD in which the optical-image display sections cover only a part of the eyes of the user, in other words, the optical-image display sections do not completely cover the eyes of the user.

As the earphones, an ear hook type or a headband type may be adopted. The earphones may be omitted. For example, the HMD 100 may be configured as a head-mounted display mounted on vehicles such as an automobile and an airplane. For example, the HMD 100 may be configured as a head-mounted display incorporated in a body protector such as a helmet.

The configurations of the HMD 100 in the embodiments are only examples and can be variously modified. For example, one of the direction key 16 and the track pad 14 provided in the control section 10 may be omitted. Another interface for operation such as a stick for operation may be provided in addition to the direction key 16 and the track pad 14 or instead of the direction key 16 and the track pad 14. Input devices such as a keyboard and a mouse may be connectable to the control section 10. The control section 10 may receive inputs from the keyboard and the mouse.

As the image display section, instead of the image display section 20 worn like eyeglasses, an image display section of another type such as an image display section worn like a cap may be adopted. The earphones 32 and 34 can be omitted as appropriate.

In the embodiments, the HMD 100 may guide image lights representing the same image to the left and right eyes of the user and cause the user to visually recognize a two-dimensional image or may guide image lights representing different images to the left and right eyes of the user and cause the user to visually recognize a three-dimensional image.

In the embodiments, a part of the components implemented by hardware may be replaced with software. Conversely, a part of the components implemented by software may be replaced with hardware. For example, in the embodiments, the image processing section 160 and a sound processing section 170 are implemented by the CPU 140 reading out and executing the computer program. However, these functional sections may be implemented by hardware circuits.

When a part or all of the functions of the invention are implemented by software, the software (a computer program) can be provided while being stored in a computer-readable recording medium. In the invention, the "computer-readable recording medium" is not limited to portable recording media such as a flexible disk and a CD-ROM and includes various internal storage devices in a computer such as a RAM and a ROM and external storage devices fixed to the computer such as a hard disk.

In the embodiments, as shown in FIGS. 1, 3, and 9, the control section 10 and the image display section 20 are formed as the separate components. However, the configuration of the control section 10 and the image display section 20 is not limited to this and can be variously modified. For example, on the inside of the image display section 20, all of the components formed in the control section 10 may be formed or a part of the components may be formed. The power supply 130 in the embodiments may be independently formed and configured to be replaceable. The components formed in the control section 10 may be redundantly formed in the image display section 20. For example, the CPU 140 shown in FIGS. 3 and 9 may be formed in both of the control section 10 and the image display section 20. Functions performed by the CPU 140 formed in the control section 10 and the CPU formed in the image display section 20 may be divided.

The control section 10 and the image display section 20 may be integrated to be a form of a wearable computer attached to clothes of the user.

The invention is not limited to the embodiments and the modifications explained above and can be implemented in various configurations without departing from the spirit of the invention. For example, the technical features in the embodiments and the modifications corresponding to the technical features in the aspects described in the summary of the invention can be replaced or combined as appropriate in order to solve a part or all of the problems or achieve a part or all of the effects. Unless the technical features are explained in this specification as essential technical features, the technical features can be deleted as appropriate.

The entire disclosure of Japanese Patent Application No. 2015-079646, filed on Apr. 9, 2016, is expressly incorporated by reference herein.

What is claimed is:

1. An information processing apparatus comprising:
   one or more processors programed to:
   generate scenario information including data for object recognition processing, the scenario information being configured such that another information processing apparatus detects a plurality of real objects, the plurality of real objects in the scenario information including a first real object and a second real object, and
   generate device information associated with the scenario information; and
   a memory configured to store the scenario information and the device information for providing the other information processing apparatus wherein:
   the scenario information includes information configured such that the other information processing apparatus executes presentation or reception of a first predetermined information when the other information processing apparatus detects only one of the first real object and the second real object, and
   the scenario information includes information configured such that the other information processing apparatus executes presentation or reception of a second predetermined information when the other information processing apparatus detects both of the first real object and the second real object, the second predetermined information including an image that indicates a moving direction of the second real object.

2. The information processing apparatus according to claim 1, wherein:
   the device information includes information representing hardware specifications of the one or more processors.

3. The information processing apparatus according to claim 1, wherein the device information includes information representing hardware specifications of a camera and information representing hardware specifications of a display to display the image.

4. The information processing apparatus according to claim 1, wherein the device information includes information representing that the execution according to the scenario information requires a camera.

5. The information processing apparatus according to claim 1, wherein
   the scenario information includes information concerning a sound output by an earphone, and
   the device information includes information representing that the execution according to the scenario information requires the earphone.

6. An image display apparatus including a display to display an image, the image display apparatus comprising:
   one or more processors configured to:
   acquire the scenario information and the device information according to claim 1, perform, upon the execution according to the scenario information, comparison of display apparatus information representing information concerning hardware specifications of the display and the acquired device information, and change, on the basis of the comparison, the presentation or the reception of the first predetermined information and the second predetermined information of the scenario information to be executed.

7. The image display apparatus according to claim 6, further comprising a camera to pick up an image of a part of the outside scene, wherein the display is worn on a head of a user and capable of transmitting an outside scene, and the one or more processors are configured to cause the display to display the image in association with a position of a specific target detected from the picked-up image.

8. A control method for an information processing apparatus, comprising:

generating scenario information including data for object recognition processing, the scenario information being configured such that another information processing apparatus detects a plurality of real objects, the plurality of real objects in the scenario information including a first real object and a second real object;

generating device information associated with the scenario information; and storing the scenario information and the device information for providing the other information processing apparatus, wherein:

the scenario information includes information configured such that the other information processing apparatus executes presentation or reception of a first predetermined information when the other information processing apparatus detects only one of the first real object and the second real object, and the scenario information includes information configured such that the other information processing apparatus executes presentation or reception of a second predetermined information when the other information processing apparatus detects both of the first real object and the second real object, the second predetermined information including an image that indicates a moving direction of the second real object.

9. A non-transitory computer-readable medium that, when executed by one or more processors, performs a method comprising:

generating scenario information including data for object recognition processing, the scenario information being configured such that another information processing apparatus detects a plurality of real objects, the plurality of real objects in the scenario information including a first real object and a second real object, generating device information associated with the scenario information; and storing the scenario information and the device information for providing the other information processing apparatus, wherein:

the scenario information includes information configured such that the other information processing apparatus executes presentation or reception of a first predetermined information when the other information processing apparatus detects only one of the first real object and the second real object, and the scenario information includes information configured such that the other information processing apparatus executes presentation or reception of a second predetermined information when the other information processing apparatus detects both of the first real object and the second real object, the second predetermined information including an image that indicates a moving direction of the second real object.

10. The information processing apparatus according to claim 1, wherein:

the first predetermined information including an image that indicates a moving direction of the first real object relative to the second real object, and the first predetermined information is different than the second predetermined information.

* * * * *